US012651609B2

(12) United States Patent
Kaneko et al.

(10) Patent No.: US 12,651,609 B2
(45) Date of Patent: Jun. 9, 2026

(54) SERVO PATTERN RECORDING HEAD, SERVO PATTERN RECORDING DEVICE, MAGNETIC TAPE, MAGNETIC TAPE CARTRIDGE, MAGNETIC TAPE DRIVE, MAGNETIC TAPE SYSTEM, AND MANUFACTURING METHOD OF MAGNETIC TAPE

(71) Applicant: FUJIFILM Corporation, Tokyo (JP)

(72) Inventors: Tetsuya Kaneko, Kanagawa (JP); Toru Nakao, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 19/008,064

(22) Filed: Jan. 2, 2025

(65) Prior Publication Data

US 2025/0140289 A1 May 1, 2025

Related U.S. Application Data

(63) Continuation of application No. PCT/JP2023/020717, filed on Jun. 2, 2023.

(30) Foreign Application Priority Data

Jul. 8, 2022 (JP) ................................. 2022-110796

(51) Int. Cl.
$G11B\ 5/592$ (2006.01)
$G11B\ 5/23$ (2006.01)
(Continued)

(52) U.S. Cl.
CPC ............ $G11B\ 5/5928$ (2013.01); $G11B\ 5/232$ (2013.01); $G11B\ 5/78$ (2013.01); $G11B\ 5/84$ (2013.01)

(58) Field of Classification Search
None
See application file for complete search history.

(56) References Cited

U.S. PATENT DOCUMENTS 6,169,640 B1 * 1/2001 Fasen ..................... G11B 5/584
6,906,887 B2 * 6/2005 Nakao .................... G11B 5/584
(Continued)

FOREIGN PATENT DOCUMENTS

JP 11-273040 A 10/1999
JP 2005-063623 A 3/2005
(Continued)

OTHER PUBLICATIONS

International Search Report issued Aug. 15, 2023 in Application No. PCT/JP2023/020717.
(Continued)

*Primary Examiner* — Peter Vincent Agustin
(74) *Attorney, Agent, or Firm* — Sughrue Mion, PLLC

(57) ABSTRACT

A servo pattern recording head includes: a plurality of head cores that are magnetically separated from each other; and a plurality of gap patterns that are formed on a front surface of each of the plurality of head cores and that are used for recording a plurality of servo patterns in a width direction of a magnetic tape by applying a magnetic field to the magnetic tape in response to a pulse current, in which the plurality of gap patterns are formed on the front surface along a direction corresponding to the width direction, and the plurality of gap patterns deviate from each other at a predetermined interval in a direction corresponding to a longitudinal direction of the magnetic tape between the gap patterns adjacent to each other along the direction corresponding to the width direction.

12 Claims, 24 Drawing Sheets

(51) Int. Cl.
    *G11B 5/78*       (2006.01)
    *G11B 5/84*       (2006.01)

(56)             References Cited

U.S. PATENT DOCUMENTS

| | | | |
|---|---|---|---|
| 2003/0099059 A1* | 5/2003 | Nakao | G11B 5/584 |
| 2005/0030661 A1* | 2/2005 | Bui | G11B 5/584 |
| 2005/0041324 A1* | 2/2005 | Tateishi | C23C 14/08 |
| 2005/0117246 A1* | 6/2005 | Sueki | G11B 5/00813 |
| 2005/0122615 A1* | 6/2005 | Horimai | G11B 5/00813 |
| 2008/0186620 A1 | 8/2008 | Tateishi et al. | |
| 2009/0073604 A1* | 3/2009 | Johnson | G11B 5/584 |
| 2009/0109566 A1* | 4/2009 | Tanaka | G11B 5/584 |
| 2019/0287561 A1* | 9/2019 | Suzuki | G11B 5/584 |
| 2021/0056986 A1* | 2/2021 | Yamaga | G11B 5/00817 |
| 2023/0098320 A1* | 3/2023 | Nakao | G11B 5/59638 |
| | | | 360/77.13 |

| | | | |
|---|---|---|---|
| 2023/0206948 A1* | 6/2023 | Nakao | G06K 19/077 |
| 2025/0095678 A1* | 3/2025 | Morita | G11B 5/584 |
| 2025/0140289 A1* | 5/2025 | Kaneko | G11B 5/584 |

FOREIGN PATENT DOCUMENTS

| | | |
|---|---|---|
| JP | 2005-166163 A | 6/2005 |
| JP | 2020-071896 A | 5/2020 |
| WO | 2022/044705 A1 | 3/2022 |

OTHER PUBLICATIONS

Written Opinion of the International Searching Authority issued Aug. 15, 2023 in Application No. PCT/JP2023/020717.

International Preliminary Report on Patentability with a Translation of the Written Opinion of the International Searching Authority issued Dec. 18, 2024 in Application No. PCT/JP2023/020717.

* cited by examiner

FIG. 12

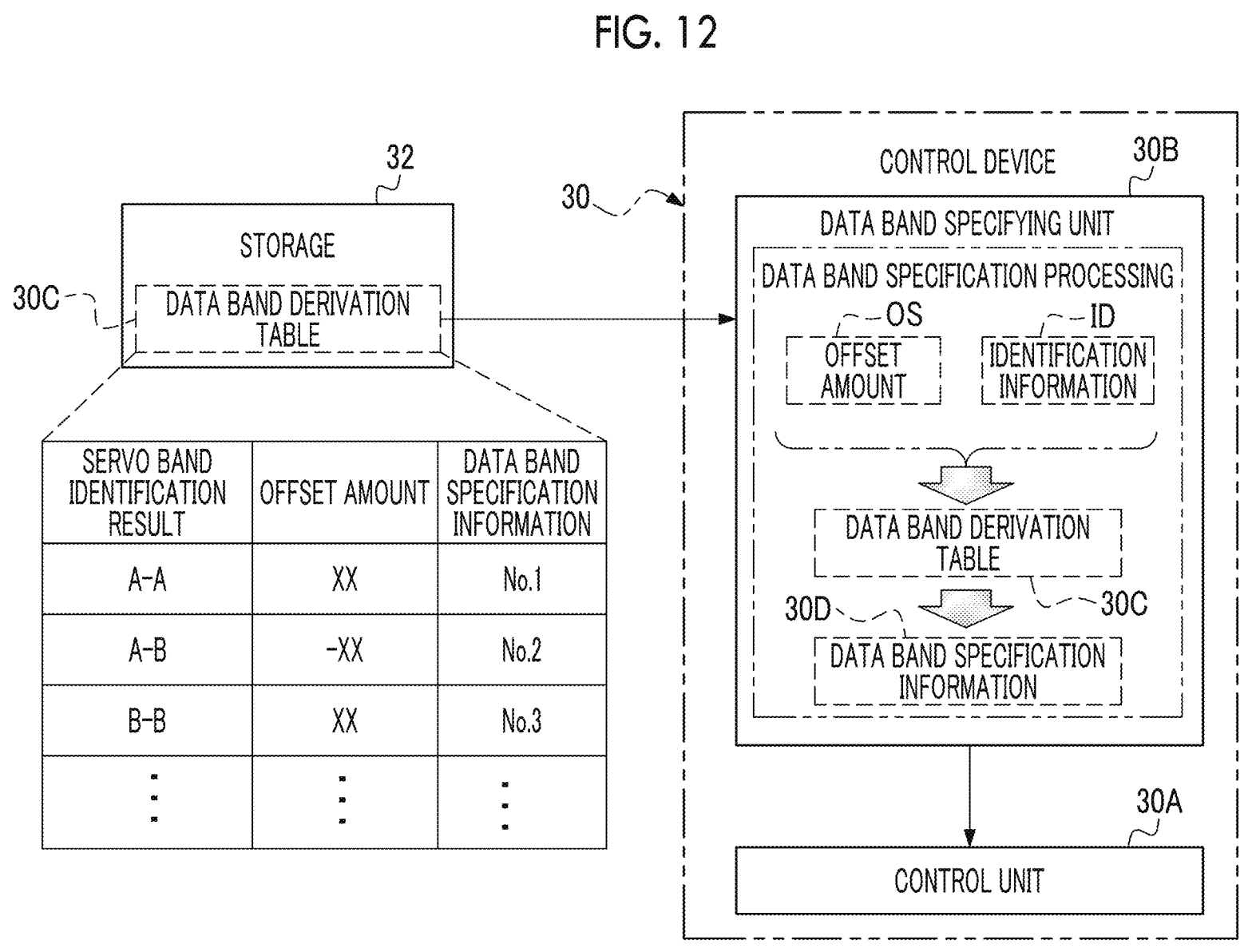

CONTROL DEVICE    30B

DATA BAND SPECIFYING UNIT

DATA BAND SPECIFICATION PROCESSING

OS    ID

OFFSET AMOUNT    IDENTIFICATION INFORMATION

DATA BAND DERIVATION TABLE    30C

DATA BAND SPECIFICATION INFORMATION

30D

CONTROL UNIT    30A

30

32

STORAGE

DATA BAND DERIVATION TABLE

30C

| SERVO BAND IDENTIFICATION RESULT | OFFSET AMOUNT | DATA BAND SPECIFICATION INFORMATION |
|---|---|---|
| A-A | XX | No.1 |
| A-B | -XX | No.2 |
| B-B | XX | No.3 |
| ... | ... | ... |

FIG. 14

SERVO PATTERN RECORDING HEAD, SERVO PATTERN RECORDING DEVICE, MAGNETIC TAPE, MAGNETIC TAPE CARTRIDGE, MAGNETIC TAPE DRIVE, MAGNETIC TAPE SYSTEM, AND MANUFACTURING METHOD OF MAGNETIC TAPE

CROSS-REFERENCE TO RELATED APPLICATIONS

This application is a continuation application of International Application No. PCT/JP2023/020717, filed Jun. 2, 2023, the disclosure of which is incorporated herein by reference in its entirety. Further, this application claims priority under 35 USC 119 from Japanese Patent Application No. 2022-110796 filed Jul. 8, 2022, the disclosure of which is incorporated by reference herein.

BACKGROUND

1. Technical Field

The technology of the present disclosure relates to a servo pattern recording head, a servo pattern recording device, a magnetic tape, a magnetic tape cartridge, a magnetic tape drive, a magnetic tape system, and a manufacturing method of a magnetic tape.

2. Related Art

JP1999-273040A (JP-H11-273040A) discloses a method of determining positional information on a linear data storage tape. The method of JP1999-273040A (JP-H11-273040A) comprises: a step of writing a plurality of servo bands having similar longitudinal patterns of magnetic transitions in a longitudinal direction of the linear data storage tape; a step of crossing the linear data storage tape in a transverse direction to provide an interval between the servo bands; and a step of providing a predetermined longitudinal offset for one pattern relative to each of the other patterns in order to distinguish the servo bands from one another in a case of reading and writing data laterally relative to the servo bands.

JP2020-071896A discloses a servo pattern recording method. JP2020-071896A discloses a servo pattern recording method of recording a servo pattern on a tape-shaped magnetic recording medium that includes a magnetic layer having a plurality of servo bands of five or more, the method comprising: determining at least three first servo bands on which first servo band identification information consisting of a plurality of bits is to be recorded, and at least two second servo bands on which second servo band identification information consisting of a plurality of bits, which is different from the first servo band identification information, is to be recorded; and recording the first servo band identification information and the second servo band identification information on the first servo band and the second servo band, respectively, with the same phase.

SUMMARY

One embodiment according to the technology of the present disclosure provides a servo pattern recording head, a servo pattern recording device, a magnetic tape, a magnetic tape cartridge, a magnetic tape drive, a magnetic tape system, and a manufacturing method of a magnetic tape, which can contribute to identification of a data band and that can realize a reduction in thermal influence (for example, thermal shrinkage of the magnetic tape due to heat generation of the servo pattern recording head) and a reduction in occurrence of crosstalk in a case of recording a servo pattern on the magnetic tape.

A first aspect according to the technology of the present disclosure provides a servo pattern recording head comprising: a plurality of head cores that are magnetically separated from each other; and a plurality of gap patterns that are formed on a front surface of each of the plurality of head cores and that are used for recording a plurality of servo patterns in a width direction of a magnetic tape by applying a magnetic field to the magnetic tape in response to a pulse current, in which the plurality of gap patterns are formed on the front surface along a direction corresponding to the width direction, and the plurality of gap patterns deviate from each other at a predetermined interval in a direction corresponding to a longitudinal direction of the magnetic tape between the gap patterns adjacent to each other along the direction corresponding to the width direction.

A second aspect according to the technology of the present disclosure provides the servo pattern recording head according to the first aspect, in which information indicated by the pulse current includes identification information for identifying the plurality of servo patterns in units of the head cores.

A third aspect according to the technology of the present disclosure provides the servo pattern recording head according to the second aspect, in which the identification information is common in the units of the head cores.

A fourth aspect according to the technology of the present disclosure provides the servo pattern recording head according to any one of the first to third aspects, in which the plurality of gap patterns are disposed in common between the head cores.

A fifth aspect according to the technology of the present disclosure provides the servo pattern recording head according to any one of the first to fourth aspects, in which the pulse currents used in units of the head cores are in phase with each other.

A sixth aspect according to the technology of the present disclosure provides a servo pattern recording device comprising: the servo pattern recording head according to any one of the first to fifth aspects; and a pulse signal generator that supplies the pulse current to the plurality of head cores, in which the pulse signal generator is provided for each of the plurality of head cores.

A seventh aspect according to the technology of the present disclosure provides a magnetic tape on which the servo pattern is recorded using the servo pattern recording head according to any one of the first to fifth aspects.

An eighth aspect according to the technology of the present disclosure provides a magnetic tape cartridge comprising: the magnetic tape according to the seventh aspect; and a case in which the magnetic tape is accommodated.

A ninth aspect according to the technology of the present disclosure provides a magnetic tape drive comprising: a running mechanism that causes the magnetic tape according to the seventh aspect to run along a predetermined path; and a magnetic head that reads the servo pattern on the predetermined path in a state in which the magnetic tape is running by means of the running mechanism.

A tenth aspect according to the technology of the present disclosure provides a magnetic tape system comprising: the magnetic tape according to the seventh aspect; and a magnetic tape drive in which a magnetic head that reads the servo pattern on a predetermined path in a state in which the magnetic tape is running along the predetermined path is mounted.

An eleventh aspect according to the technology of the present disclosure provides a manufacturing method of a magnetic tape, comprising: supplying a pulse current to a plurality of head cores that are magnetically separated from each other; and recording a plurality of servo patterns in a width direction of the magnetic tape by applying a magnetic field to the magnetic tape in response to the pulse current via a plurality of gap patterns that are formed on a front surface of each of the plurality of head cores, in which the plurality of gap patterns are formed on the front surface along a direction corresponding to the width direction, and the plurality of gap patterns deviate from each other at a predetermined interval in a direction corresponding to a longitudinal direction of the magnetic tape between the gap patterns adjacent to each other along the direction corresponding to the width direction.

A twelfth aspect according to the technology of the present disclosure provides the manufacturing method of a magnetic tape according to the eleventh aspect, in which information indicated by the pulse current includes identification information for identifying the plurality of servo patterns in units of the head cores.

A thirteenth aspect according to the technology of the present disclosure provides a magnetic tape in which a plurality of sets of a plurality of servo bands are formed in a width direction, and a plurality of servo patterns are arranged in the servo band along a longitudinal direction of the magnetic tape, in which pairs of servo patterns corresponding to each other between the servo bands deviate from each other at a predetermined interval in the longitudinal direction of the magnetic tape between the servo bands adjacent to each other in the width direction, and set identification information for identifying the corresponding set is recorded in the servo pattern.

A fourteenth aspect according to the technology of the present disclosure provides the magnetic tape according to the thirteenth aspect, in which the set includes at least three or more servo bands.

BRIEF DESCRIPTION OF THE DRAWINGS

Exemplary embodiments of the technology of the disclosure will be described in detail based on the following figures, wherein:

FIG. 12 is a conceptual diagram showing an example of the processing content of the data band specifying unit of the control device provided in the magnetic tape drive according to the embodiment;

FIG. 14 is a conceptual diagram showing an example of an aspect in which the magnetic tape according to the embodiment before and after a width of the magnetic tape contracts is observed from the front surface side of the magnetic tape;

Figure 21:
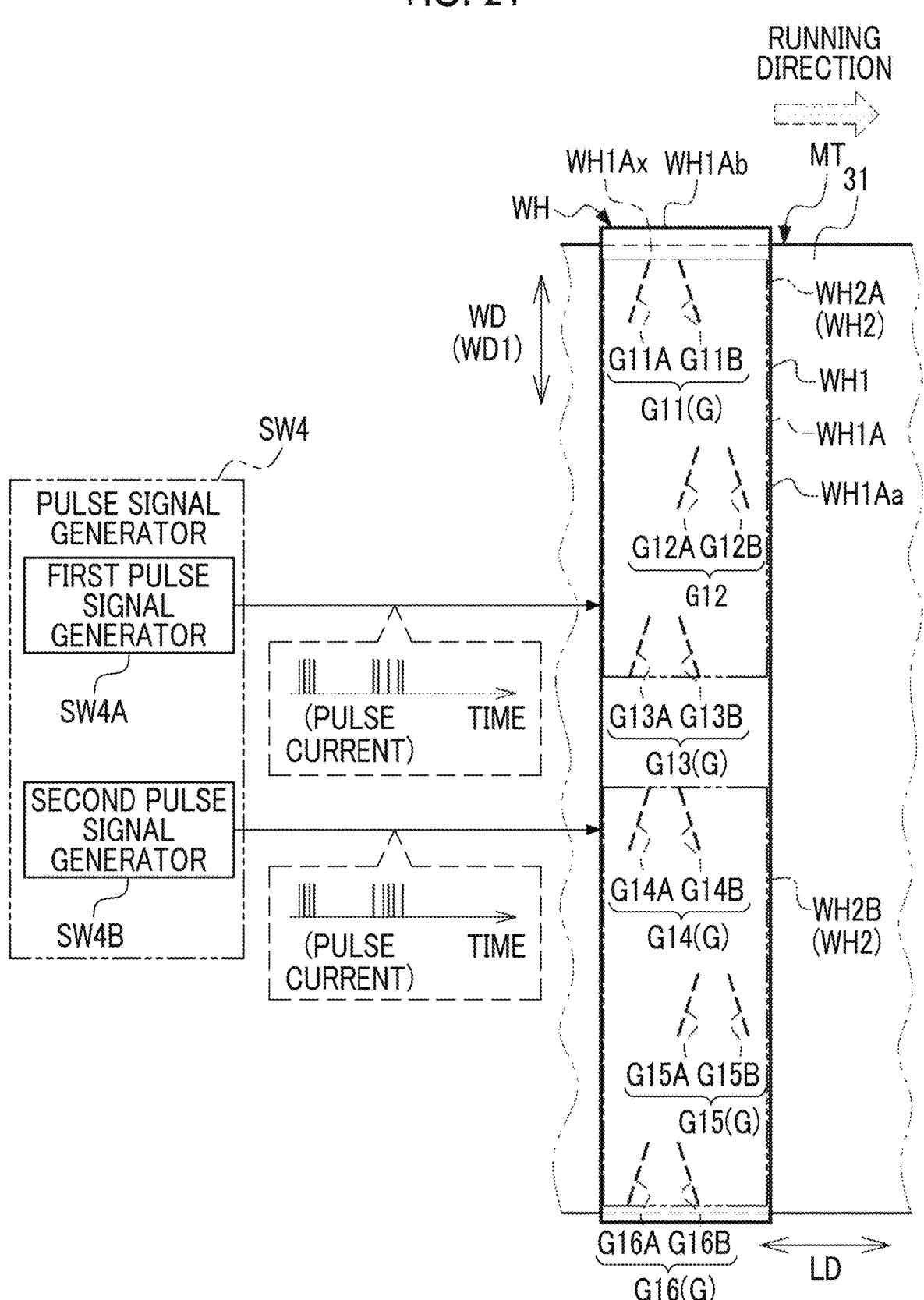
Figure 22:
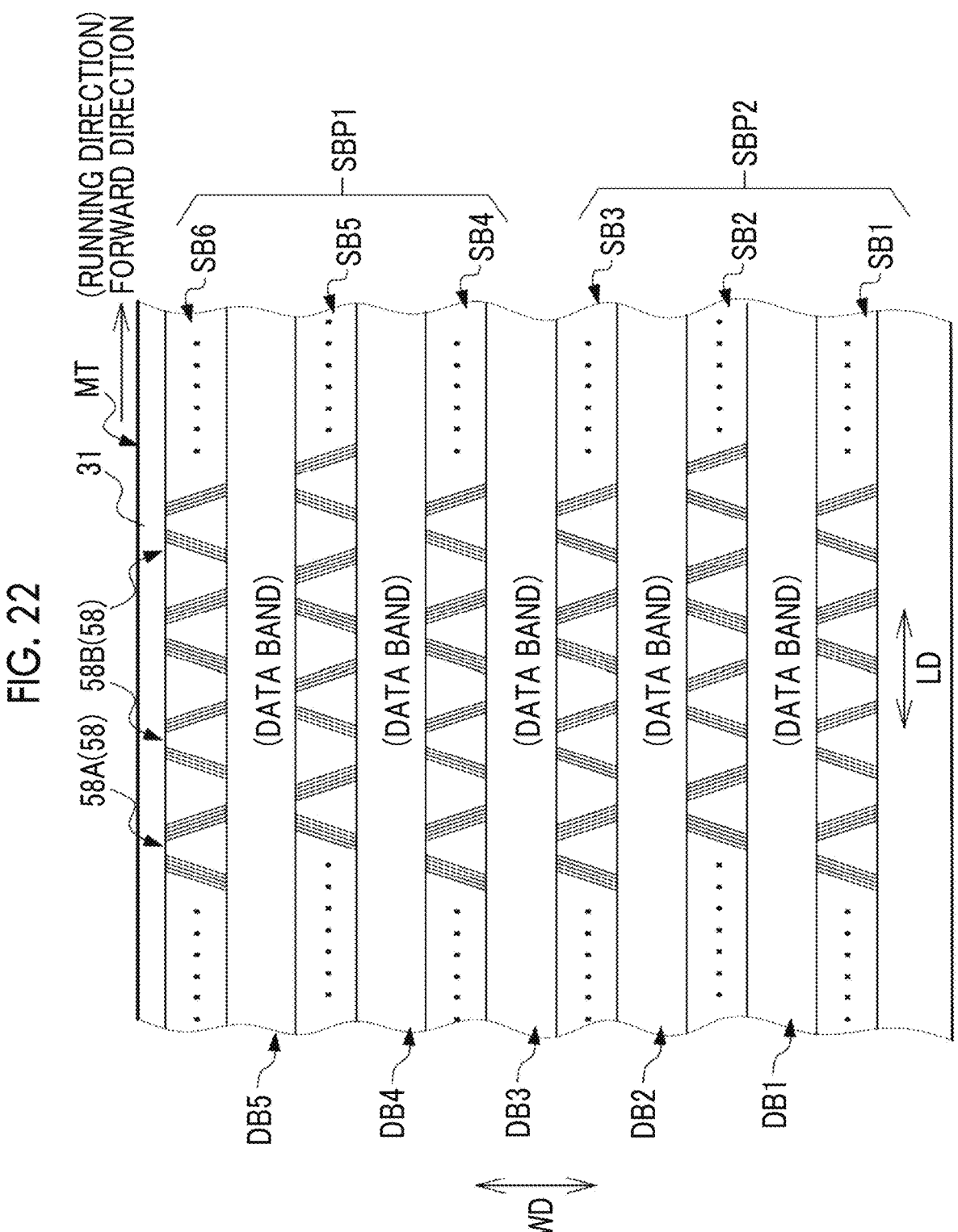
Figure 23:
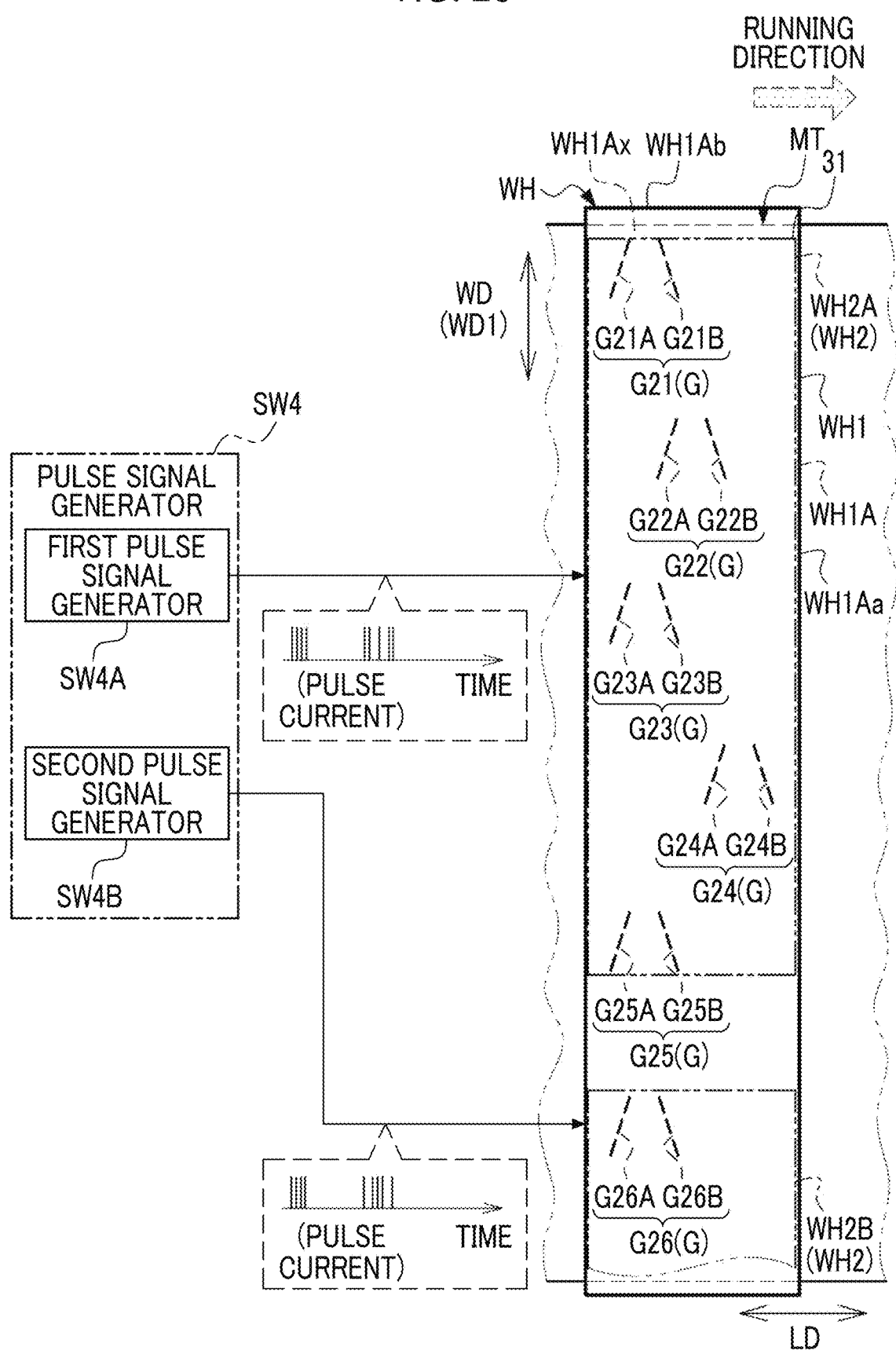
Figure 24:
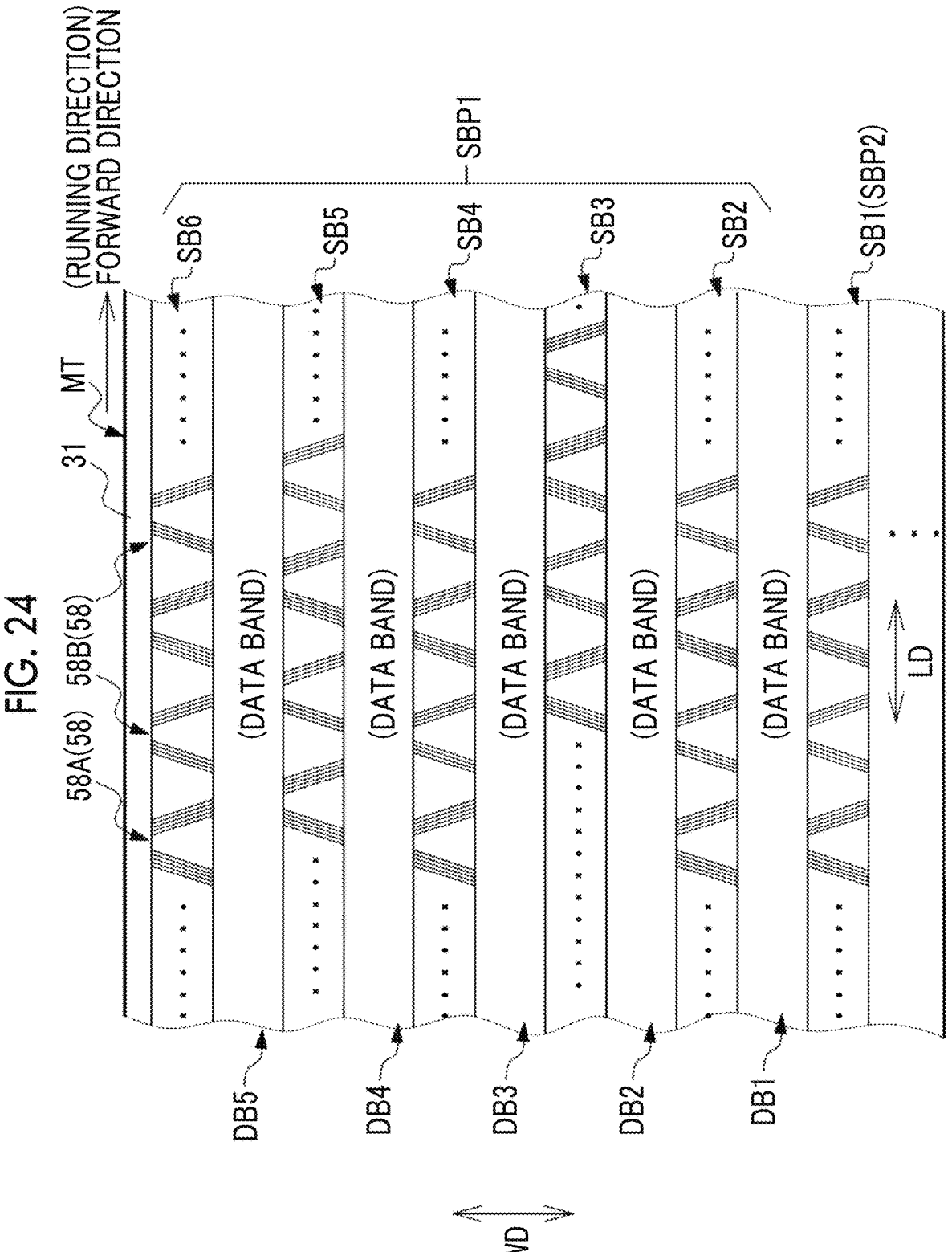

5 from the front surface side of the magnetic tape (that is, the rear surface side of the servo pattern recording head);

FIG. 21 is a conceptual diagram showing an example of a relationship between a pulse signal generator and a servo pattern recording head provided in the servo writer according to a first modification example, and an example of an aspect in which a state in which the servo pattern recording head provided in the servo writer according to the embodiment is disposed on the magnetic tape is observed from the front surface side of the magnetic tape (that is, a rear surface side of the servo pattern recording head);

FIG. 22 is a conceptual diagram showing an example of an aspect in which the magnetic tape according to the first modification example is observed from the front surface side of the magnetic tape;

FIG. 23 is a conceptual diagram showing an example of a relationship between a pulse signal generator and a servo pattern recording head provided in the servo writer according to a second modification example, and an example of an aspect in which a state in which the servo pattern recording head provided in the servo writer according to the embodiment is disposed on the magnetic tape is observed from the front surface side of the magnetic tape (that is, a rear surface side of the servo pattern recording head); and FIG. 24 is a conceptual diagram showing an example of an aspect in which the magnetic tape according to the second modification example is observed from the front surface side of the magnetic tape.

DETAILED DESCRIPTION

In the following, examples of embodiments of a servo pattern recording device, a magnetic tape, a magnetic tape cartridge, a magnetic tape drive, a magnetic tape system, a detection device, an inspection device, a servo pattern recording method, a manufacturing method of a magnetic tape, a detection method, and an inspection method according to the technology of the present disclosure will be described with reference to the accompanying drawings.

First, the terms used in the following description will be described.

NVM is an abbreviation for "non-volatile memory". CPU is an abbreviation for "central processing unit". RAM is an abbreviation for "random access memory". EEPROM is an abbreviation for "electrically erasable and programmable read only memory". SSD is an abbreviation for "solid state drive". HDD is an abbreviation for "hard disk drive". ASIC is an abbreviation for "application specific integrated circuit". FPGA is an abbreviation for "field-programmable gate array". PLC is an abbreviation for "programmable logic controller". IC is an abbreviation for "integrated circuit". RFID is an abbreviation for "radio frequency identifier". BOT is an abbreviation of "beginning of tape". EOT is an abbreviation for "end of tape". UI is an abbreviation for "user interface". WAN is an abbreviation for "wide area network". LAN is an abbreviation for "local area network".

Figure 1:
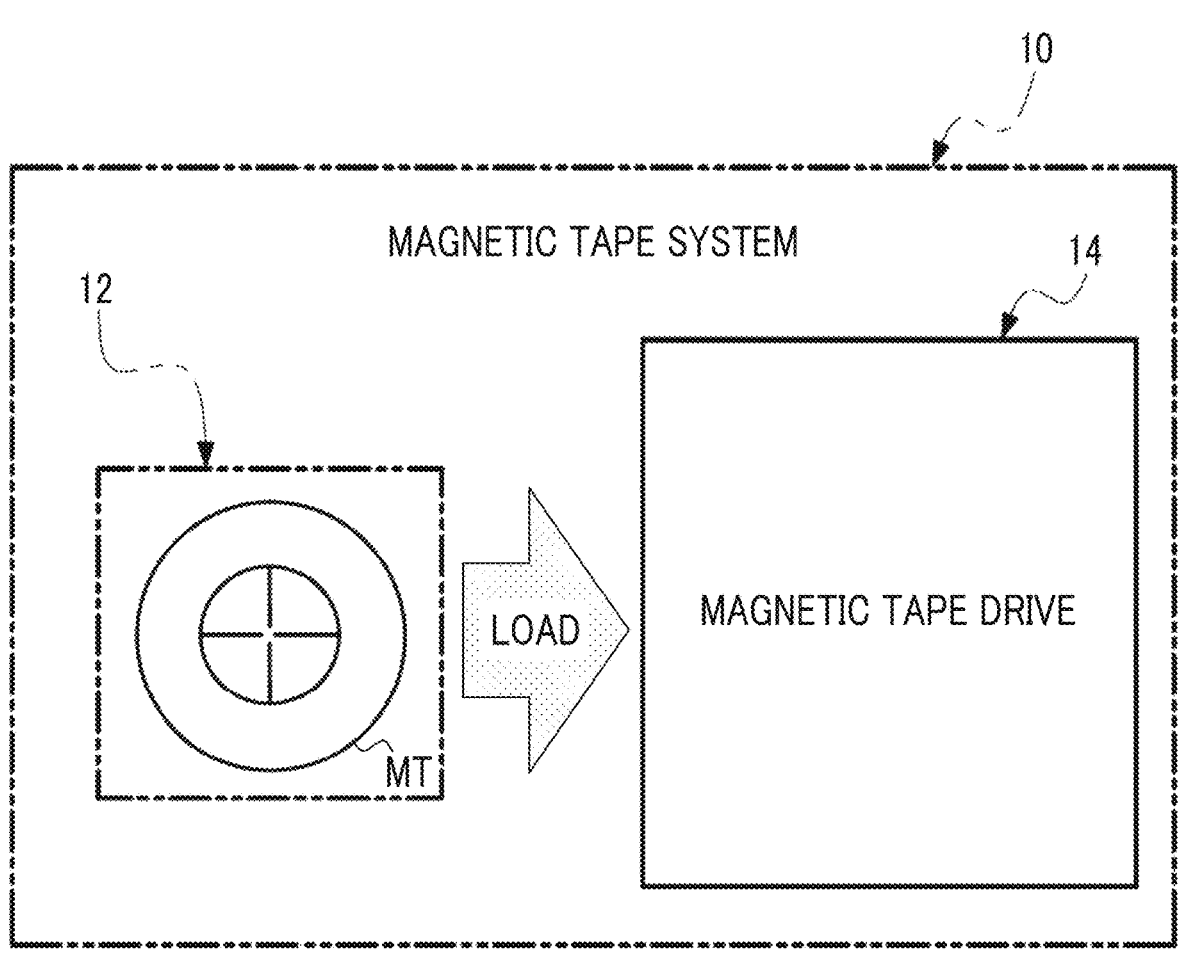
FIG. 1 is a block diagram showing an example of a configuration of a magnetic tape system according to an embodiment.

As shown in FIG. 1 as an example, a magnetic tape system 10 comprises a magnetic tape cartridge 12 and a magnetic tape drive 14. The magnetic tape drive 14 is loaded with the magnetic tape cartridge 12. The magnetic tape cartridge 12 accommodates a magnetic tape MT. The magnetic tape drive 14 extracts the magnetic tape MT from the loaded magnetic tape cartridge 12, and records data onto the magnetic tape MT or reads data from the magnetic tape MT while the extracted magnetic tape MT is running.

In the present embodiment, the magnetic tape MT is an example of a "magnetic tape" according to the technology of the present disclosure. In addition, in the present embodiment, the magnetic tape system 10 is an example of a "magnetic tape system" according to the technology of the present disclosure. In addition, in the present embodiment, the magnetic tape drive 14 is an example of a "magnetic tape drive" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. In the following description, for convenience of description, in FIGS. 2 to 4, a direction of loading the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the description of the structure to be shown below, "front" indicates the front side of the magnetic tape cartridge 12.

In addition, in the following description, for convenience of description, in FIGS. 2 to 4, a direction of an arrow B that is perpendicular to the direction of the arrow A is defined as a right direction, and a side of the magnetic tape cartridge 12 in the right direction is defined as a right side of the magnetic tape cartridge 12. In the description of the structure to be shown below, "right" indicates the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the description of the structure to be shown below, "left" indicates the left side of the magnetic tape cartridge 12.

In addition, in the following description, for convenience of description, in FIGS. 2 to 4, a direction perpendicular to the direction of the arrow A and to the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the description of the structure to be shown below, "upper" indicates the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the description of the structure to be shown below, "rear" indicates the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the description of the structure to be shown below, "lower" indicates the lower side of the magnetic tape cartridge 12.

Figure 2:
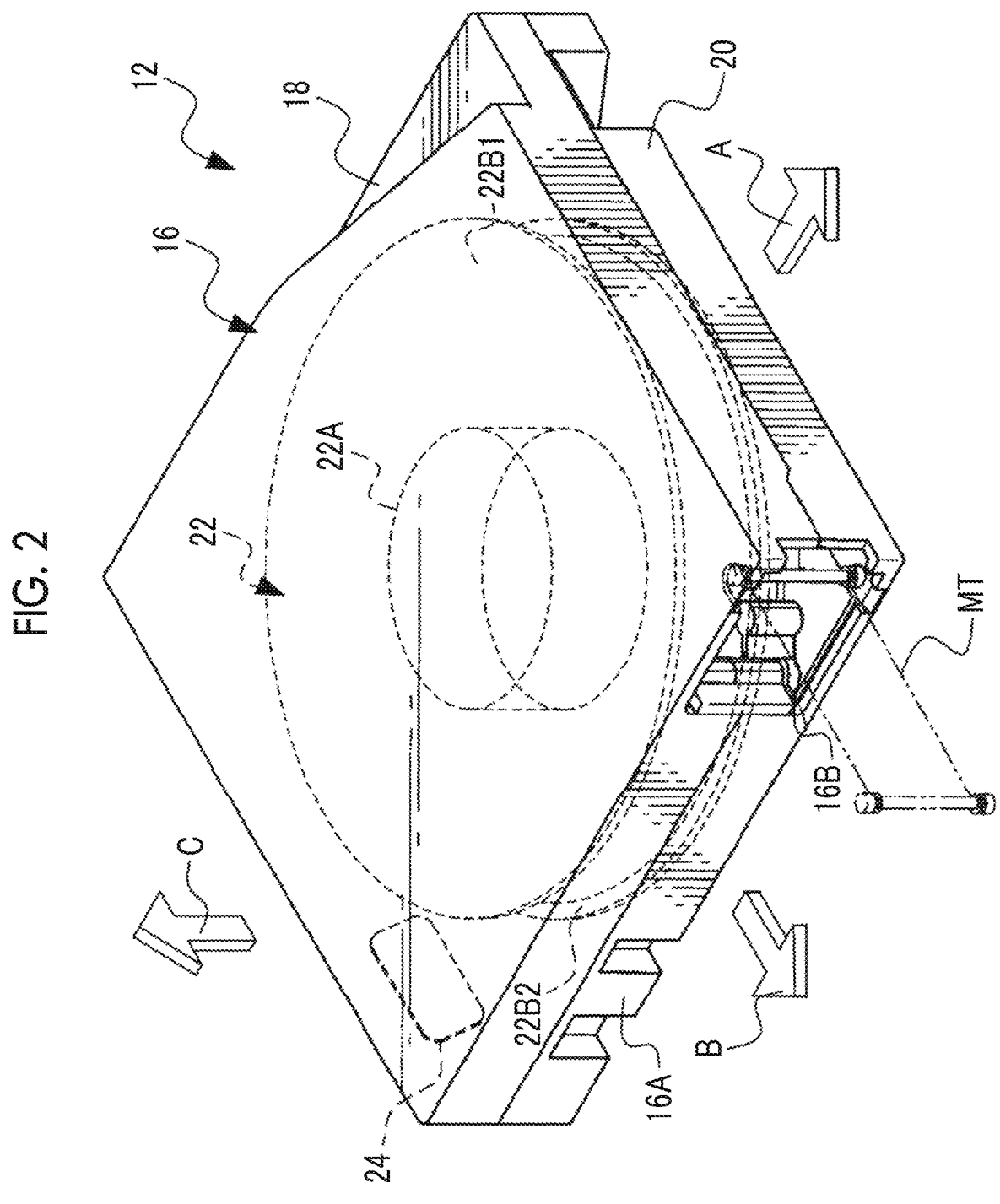
FIG. 2 is a schematic perspective view of an example of an appearance of a magnetic tape cartridge according to the embodiment.

As shown in FIG. 2 as an example, the magnetic tape cartridge 12 has a substantially rectangular shape in a plan view and comprises a box-like case 16. The case 16 is an example of a "case" according to the technology of the present disclosure. The magnetic tape MT is accommodated in the case 16. The case 16 is made of resin such as polycarbonate and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used.

A feeding reel 22 is rotatably accommodated inside the case 16. The feeding reel 22 comprises a reel hub 22A, an upper flange 22B1, and a lower flange 22B2. The reel hub 22A is formed in a cylindrical shape. The reel hub 22A is an axial center portion of the feeding reel 22, has an axial center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A. The reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is extracted from the opening 16B.

A cartridge memory 24 is provided in the lower case 20. Specifically, the cartridge memory 24 is accommodated in a right rear end portion of the lower case 20. An IC chip having an NVM is mounted in the cartridge memory 24. In the present embodiment, a so-called passive RFID tag is adopted as the cartridge memory 24, and various pieces of information are read and written with respect to the cartridge memory 24 in a noncontact manner.

The cartridge memory 24 stores management information for managing the magnetic tape cartridge 12. Examples of the management information include information about the cartridge memory 24 (for example, information for specifying the magnetic tape cartridge 12), information about the magnetic tape MT (for example, information indicating a recording capacity of the magnetic tape MT, information indicating an outline of the data recorded on the magnetic tape MT, information indicating items of the data recorded on the magnetic tape MT, and information indicating a recording format of the data recorded on the magnetic tape MT), and information about the magnetic tape drive 14 (for example, information indicating a specification of the magnetic tape drive 14 and a signal used in the magnetic tape drive 14).

Figure 3:
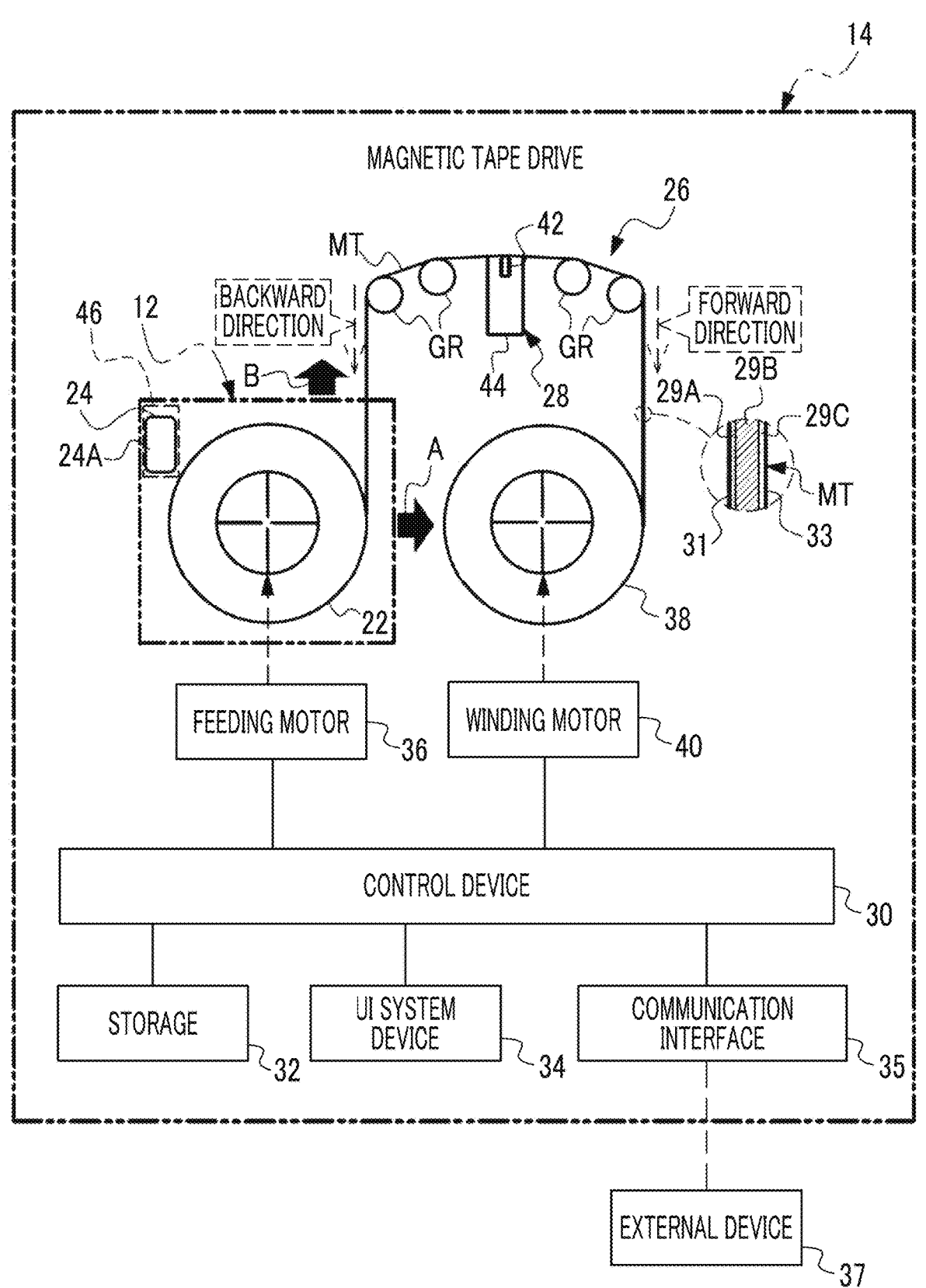
FIG. 3 is a schematic configuration diagram showing an example of a hardware configuration of a magnetic tape drive according to the embodiment.

As shown in FIG. 3 as an example, the magnetic tape drive 14 comprises a transport device 26, a magnetic head 28, a control device 30, a storage 32, a UI system device 34, and a communication interface 35. The magnetic tape cartridge 12 is loaded into the magnetic tape drive 14 along the direction of the arrow A. In the magnetic tape drive 14, the magnetic tape MT is used by being extracted from the magnetic tape cartridge 12.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains a ferromagnetic powder. As the ferromagnetic powder, for example, a ferromagnetic powder generally used in the magnetic layers of various magnetic recording media is used. Preferable specific examples of the ferromagnetic powder include a hexagonal ferrite powder. Examples of the hexagonal ferrite powder include a hexagonal strontium ferrite powder and a hexagonal barium ferrite powder. The back coating layer 29C is a layer containing a non-magnetic powder such as carbon black. The base film 29B is also referred to as a support, and is made of, for example, polyethylene terephthalate, polyethylene naphthalate, or polyamide. A non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT.

The magnetic tape drive 14 performs magnetic processing on the front surface 31 of the magnetic tape MT by using the magnetic head 28. Here, the magnetic processing refers to recording the data on the front surface 31 of the magnetic tape MT and reading the data (that is, reproducing the data) from the front surface 31 of the magnetic tape MT. In the present embodiment, the magnetic tape drive 14 selectively performs the recording of the data on the front surface 31 of the magnetic tape MT and the reading of the data from the front surface 31 of the magnetic tape MT by using the magnetic head 28. That is, the magnetic tape drive 14 extracts the magnetic tape MT from the magnetic tape cartridge 12, and records the data on the front surface 31 of the extracted magnetic tape MT by using the magnetic head 28 or reads the data from the front surface 31 of the extracted magnetic tape MT by using the magnetic head 28.

The control device 30 controls the entire magnetic tape drive 14. In the present embodiment, although the control device 30 is implemented by an ASIC, the technology of the present disclosure is not limited to this. For example, the control device 30 may be implemented by an FPGA and/or a PLC. In addition, the control device 30 may be implemented by the computer including a CPU, a flash memory (for example, an EEPROM and/or an SSD), and a RAM. In addition, the control device 30 may be implemented by combining two or more of an ASIC, an FPGA, a PLC, and a computer. That is, the control device 30 may be implemented by a combination of a hardware configuration and a software configuration.

The storage 32 is connected to the control device 30, and the control device 30 writes various pieces of information to the storage 32 and reads out various pieces of information from the storage 32. Examples of the storage 32 include a flash memory and/or an HDD. The flash memory and the HDD are merely examples, and any memory may be used as long as the memory is a non-volatile memory that can be mounted in the magnetic tape drive 14.

The UI system device 34 is a device having a reception function of receiving an instruction signal indicating an instruction from a user and a presentation function of presenting the information to the user. The reception function is implemented by a touch panel, a hard key (for example, a keyboard), and/or a mouse, for example. The presentation function is implemented by a display, a printer, and/or a speaker, for example. The UI system device 34 is connected to the control device 30. The control device 30 acquires the instruction signal received by the UI system device 34. The UI system device 34 presents various pieces of information to the user under the control of the control device 30.

The communication interface 35 is connected to the control device 30. In addition, the communication interface 35 is connected to an external device 37 via a communication network (not shown) such as a WAN and/or a LAN. The communication interface 35 controls the exchange of various pieces of information (for example, data to be recorded on the magnetic tape MT, data read from the magnetic tape MT, and/or an instruction signal given to the control device 30) between the control device 30 and the external device 37. Examples of the external device 37 include a personal computer and a mainframe.

The transport device 26 is a device that selectively transports the magnetic tape MT along a predetermined path in a forward direction and a backward direction, and comprises a feeding motor 36, a winding reel 38, a winding motor 40, and a plurality of guide rollers GR. Here, the forward direction indicates a feeding direction of the magnetic tape MT, and the backward direction indicates a rewinding direction of the magnetic tape MT. In the present embodiment, the transport device 26 is an example of a "running mechanism" according to the technology of the present disclosure.

The feeding motor 36 rotates the feeding reel 22 in the magnetic tape cartridge 12 under the control of the control device 30. The control device 30 controls the feeding motor 36 to control a rotation direction, a rotation speed, a rotation torque, and the like of the feeding reel 22.

The winding motor 40 rotates the winding reel 38 under the control of the control device 30. The control device 30 controls the winding motor 40 to control a rotation direction, a rotation speed, a rotation torque, and the like of the winding reel 38.

In a case where the magnetic tape MT is wound by the winding reel 38, the control device 30 rotates the feeding motor 36 and the winding motor 40 such that the magnetic tape MT runs along the predetermined path in the forward direction. The rotation speed, the rotation torque, and the like of the feeding motor 36 and the winding motor 40 are adjusted in accordance with a speed at which the magnetic tape MT is wound around the winding reel 38. In addition, the rotation speed, the rotation torque, and the like of each of the feeding motor 36 and the winding motor 40 are adjusted by the control device 30, thereby applying the tension to the magnetic tape MT. In addition, the tension applied to the magnetic tape MT is controlled by adjusting the rotation speed, the rotation torque, and the like of each of the feeding motor 36 and the winding motor 40 via the control device 30.

In a case where the magnetic tape MT is rewound to the feeding reel 22, the control device 30 rotates the feeding motor 36 and the winding motor 40 such that the magnetic tape MT runs along the predetermined path in the backward direction.

In the present embodiment, the tension applied to the magnetic tape MT is controlled by controlling the rotation speed, the rotation torque, and the like of the feeding motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller that guides the magnetic tape MT. The predetermined path, that is, a running path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 so as to come into contact with the running magnetic tape MT. The magnetic element unit 42 includes a plurality of magnetic elements.

The magnetic element unit 42 records data on the magnetic tape MT transported by the transport device 26, and reads data from the magnetic tape MT transported by the transport device 26. Here, the data refers to, for example, a servo pattern 58 (see FIG. 9) and data other than the servo pattern 58, that is, data recorded in a data band DB (see FIG. 9).

The magnetic tape drive 14 comprises a noncontact read/write device 46. The noncontact read/write device 46 is disposed to face a back surface 24A of the cartridge memory 24 on the lower side of the magnetic tape cartridge 12 in a state in which the magnetic tape cartridge 12 is loaded, and reads and writes the information with respect to the cartridge memory 24 in a noncontact manner.

Figure 4:
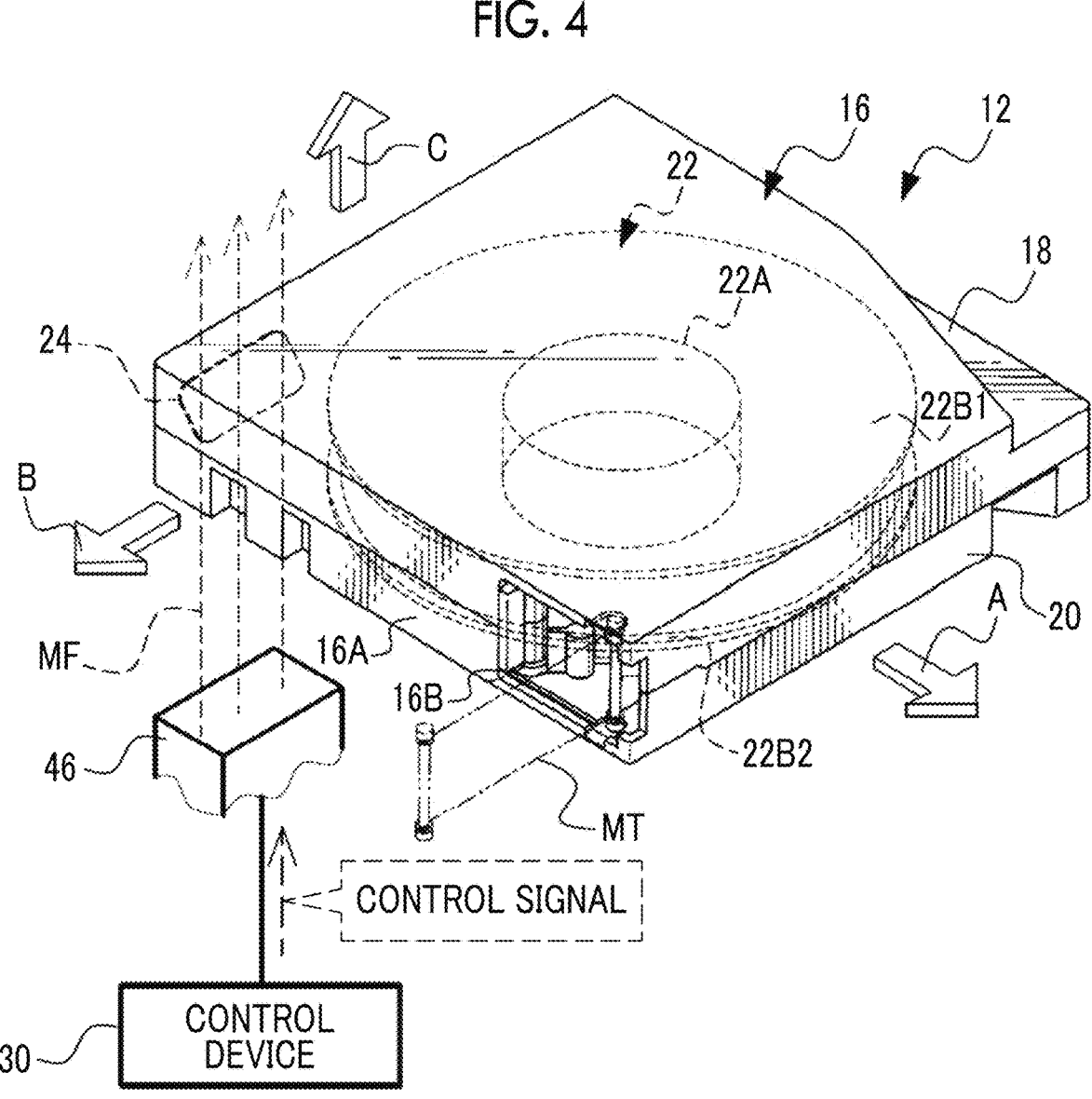
FIG. 4 is a schematic perspective view showing an example of an aspect in which a magnetic field is released by a noncontact read/write device from a lower side of the magnetic tape cartridge according to the embodiment.

As shown in FIG. 4 as an example, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the control device 30. The control device 30 outputs a control signal to the noncontact read/write device 46. The control signal is a signal for controlling the cartridge memory 24. The noncontact read/write device 46 generates the magnetic field MF in response to the control signal input from the control device 30, and releases the generated magnetic field MF toward the cartridge memory 24.

The noncontact read/write device 46 performs processing on the cartridge memory 24 in response to the control signal by performing noncontact communication with the cartridge memory 24 via the magnetic field MF. For example, under the control of the control device 30, the noncontact read/write device 46 selectively performs processing of reading the information from the cartridge memory 24 and processing of storing the information in the cartridge memory 24 (that is, processing of writing the information to the cartridge memory 24).

Figure 5:
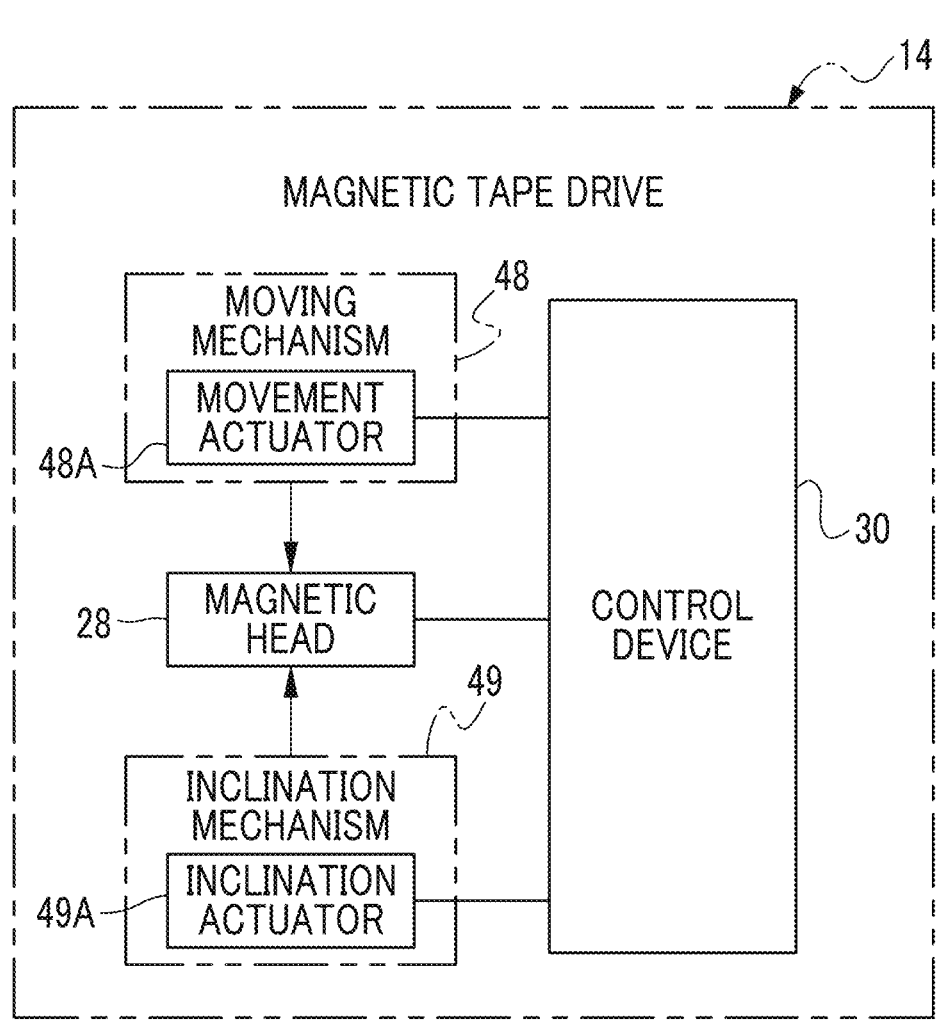
FIG. 5 is a schematic configuration diagram showing an example of the hardware configuration of the magnetic tape drive according to the embodiment.

As shown in FIG. 5 as an example, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the control device 30, and the control device 30 controls the movement actuator 48A. The movement actuator 48A generates power under the control of the control device 30. The moving mechanism 48 moves the magnetic head 28 in a width direction of the magnetic tape MT by receiving the power generated by the movement actuator 48A.

The magnetic tape drive 14 comprises an inclination mechanism 49. The inclination mechanism 49 includes an inclination actuator 49A. Examples of the inclination actuator 49A include a voice coil motor and/or a piezo actuator. The inclination actuator 49A is connected to the control device 30, and the control device 30 controls the inclination actuator 49A. The inclination actuator 49A generates power under the control of the control device 30. The inclination mechanism 49 inclines the magnetic head 28 to a longitudinal direction LD side of the magnetic tape MT with respect to the width direction WD by receiving the power generated by the inclination actuator 49A (see FIG. 17). That is, the magnetic head 28 is skewed on the magnetic tape MT under the control of the control device 30.

Figure 6:
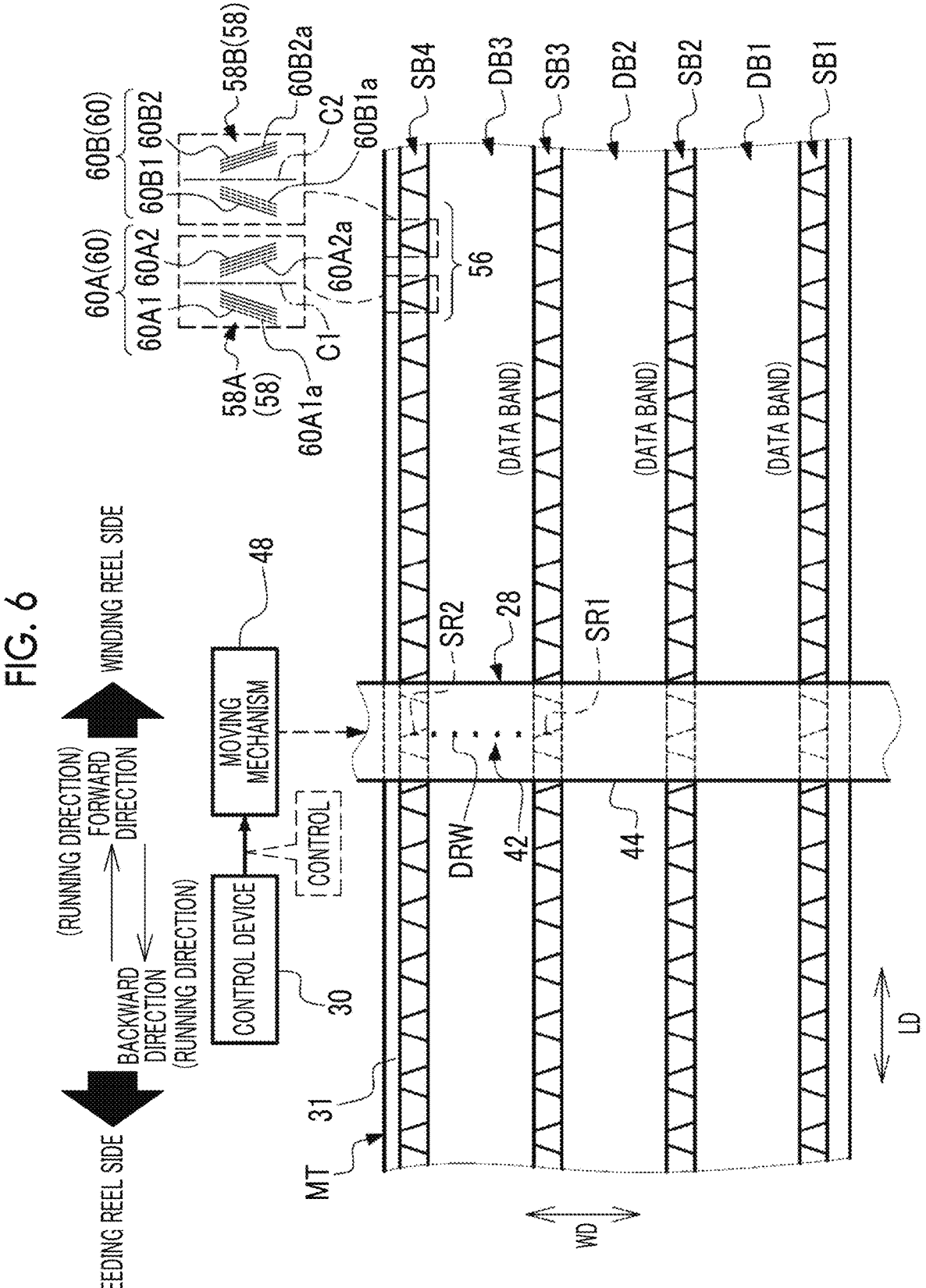
FIG. 6 is a conceptual diagram showing an example of an aspect in which a magnetic tape according to the embodiment is observed from a front surface side of the magnetic tape.

As shown in FIG. 6 as an example, on the front surface 31 of the magnetic tape MT, servo bands SB1, SB2, SB3, and SB4 and data bands DB1, DB2, and DB3 are formed. The servo bands SB1 to SB4 are examples of a "servo band" according to the technology of the present disclosure. In the following, for convenience of description, in a case where the distinction is not specifically needed, the servo bands SB1 to SB4 are referred to as a servo band SB, and the data bands DB1 to DB3 are referred to as a data band DB.

The servo bands SB1 to SB4 and the data bands DB1 to DB3 are formed along the longitudinal direction LD (that is, an overall length direction) of the magnetic tape MT. Here, the overall length direction LD of the magnetic tape MT refers to, in other words, the running direction of the magnetic tape MT. The running direction of the magnetic tape MT is defined in two directions of the forward direction which is a direction in which the magnetic tape MT runs from the feeding reel 22 side to the winding reel 38 side (hereinafter, also simply referred to as a "forward direction"), and the backward direction which is a direction in which the magnetic tape MT runs from the winding reel 38 side to the feeding reel 22 side (hereinafter, also simply referred to as a "backward direction").

The servo bands SB1 to SB4 are arranged at positions spaced in the width direction WD of the magnetic tape MT (hereinafter, also simply referred to as a "width direction WD"). For example, the servo bands SB1 to SB4 are arranged at equal intervals along the width direction WD. In the present embodiment, the term "equal intervals" refers to equal intervals in the sense of including, in addition to a completely equal interval, an error that is generally acceptable in the technical field to which the technology of the present disclosure belongs, and that does not contradict the purpose of the technology of the present disclosure.

The data band DB1 is disposed between the servo band SB1 and the servo band SB2, and the data band DB2 is disposed between the servo band SB2 and the servo band SB3. The data band DB3 is disposed between the servo band SB3 and the servo band SB4. That is, the servo bands SB and the data bands DB are arranged alternately along the width direction WD.

In the example shown in FIG. 6, for convenience of description, four servo bands SB and three data bands DB are shown, but these are merely examples, and two servo bands SB and one data band DB may be used, or three servo bands and two data bands may be used. In addition, the technology of the present disclosure is established even in a case where five or more servo bands SB and four or more data bands DB are used.

A plurality of servo patterns 58 are recorded on the servo band SB along the longitudinal direction LD of the magnetic tape MT. The servo patterns 58 are classified into a servo pattern 58A and a servo pattern 58B. The plurality of servo patterns 58 are disposed at regular intervals along the longitudinal direction LD of the magnetic tape MT. In the present embodiment, the term "regular" refers to the regularity in the sense of including, in addition to the exact regularity, an error that is generally acceptable in the technical field to which the technology of the present disclosure belongs, and that does not contradict the purpose of the technology of the present disclosure.

The servo band SB is divided by a plurality of frames 56 along the longitudinal direction LD of the magnetic tape MT. The frame 56 is defined by a set of servo patterns 58. In the example shown in FIG. 6, servo patterns 58A and 58B are shown as an example of the set of servo patterns 58. The servo patterns 58A and 58B are adjacent to each other along the longitudinal direction LD of the magnetic tape MT, and the servo pattern 58A is positioned on the upstream side in the forward direction and the servo pattern 58B is positioned on the downstream side in the forward direction in the frame 56.

The servo pattern 58 consists of a linear magnetization region pair 60. The linear magnetization region pair 60 is classified into a linear magnetization region pair 60A and a linear magnetization region pair 60B.

The servo pattern 58A consists of the linear magnetization region pair 60A. In the example shown in FIG. 6, linear magnetization regions 60A1 and 60A2 are shown as an example of the linear magnetization region pair 60A. Each of the linear magnetization regions 60A1 and 60A2 is a linearly magnetized region.

The linear magnetization regions 60A1 and 60A2 are inclined in opposite directions with respect to an imaginary straight line C1 which is an imaginary straight line along the width direction WD. In the example shown in FIG. 6, the linear magnetization regions 60A1 and 60A2 are inclined line-symmetrically with respect to the imaginary straight line C1. More specifically, the linear magnetization regions 60A1 and 60A2 are formed in a state of being not parallel to each other and being inclined at a predetermined angle (for example, 5 degrees) in opposite directions on the longitudinal direction LD side of the magnetic tape MT with the imaginary straight line C1 as a symmetry axis.

The linear magnetization region 60A1 is a set of magnetization straight lines 60A1a, which are five magnetized straight lines. The linear magnetization region 60A2 is a set of magnetization straight lines 60A2a, which are five magnetized straight lines.

The servo pattern 58B consists of the linear magnetization region pair 60B. In the example shown in FIG. 6, linear magnetization regions 60B1 and 60B2 are shown as an example of the linear magnetization region pair 60B. Each of the linear magnetization regions 60B1 and 60B2 is a linearly magnetized region.

The linear magnetization regions 60B1 and 60B2 are inclined in opposite directions with respect to an imaginary straight line C2 which is an imaginary straight line along the width direction WD. In the example shown in FIG. 6, the linear magnetization regions 60B1 and 60B2 are inclined line-symmetrically with respect to the imaginary straight line C2. More specifically, the linear magnetization regions 60B1 and 60B2 are formed in a state of being not parallel to each other and being inclined at a predetermined angle (for example, 5 degrees) in opposite directions on the longitudinal direction LD side of the magnetic tape MT with the imaginary straight line C2 as a symmetry axis.

The linear magnetization region 60B1 is a set of magnetization straight lines 60B1a, which are four magnetized straight lines. The linear magnetization region 60B2 is a set of magnetization straight lines 60B2a, which are four magnetized straight lines.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged linearly along the longitudinal direction LD of the holder 44. The magnetic element unit 42 includes a pair of servo reading elements SR and a plurality of data read/write elements DRW as the plurality of magnetic elements. A length of the holder 44 in the longitudinal direction is sufficiently long with respect to the width of the magnetic tape MT. For example, the length of the holder 44 in the longitudinal direction is set to a length exceeding the width of the magnetic tape MT even in a case where the magnetic element unit 42 is disposed at any position on the magnetic tape MT.

The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB2, and the servo reading element SR2 is provided at a position corresponding to the servo band SB3.

The plurality of data read/write elements DRW are disposed linearly between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 6, the plurality of data read/write elements DRW are provided at positions corresponding to the data band DB3.

The control device 30 acquires a servo signal which is a result of reading the servo pattern 58 by the servo reading element SR, and performs servo control in response to the acquired servo signal. Here, the servo control refers to control of moving the magnetic head 28 in the width direction WD of the magnetic tape MT by operating the moving mechanism 48 in accordance with the servo pattern 58 read by the servo reading element SR.

By performing the servo control, the plurality of data read/write elements DRW are positioned on a designated region in the data band DB, and perform the magnetic processing on the designated region in the data band DB. In the example shown in FIG. 6, the plurality of data read/write elements DRW perform the magnetic processing on the designated region in the data band DB2.

In addition, in a case where the data band DB of which the data is to be read by the magnetic element unit 42 is changed (in the example shown in FIG. 6, in a case where the data band DB of which the data is to be read by the magnetic element unit 42 is changed from the data band DB2 to the data band DB1), the moving mechanism 48 moves the magnetic head 28 in the width direction WD to change the position of the pair of servo reading elements SR under the control of the control device 30. That is, by moving the magnetic head 28 in the width direction WD, the moving mechanism 48 moves the servo reading element SR1 to a position corresponding to the servo band SB1 and moves the servo reading element SR2 to the position corresponding to the servo band SB2. As a result, the positions of the plurality of data read/write elements DRW are changed from on the data band DB2 to on the data band DB1, and the plurality of data read/write elements DRW perform the magnetic processing on the data band DB1.

In addition, the same control is also performed in a case where the data band DB of which the data is to be read by the magnetic element unit 42 is changed from the data band DB2 to the data band DB3. In addition, the same control is also performed in a case where the data band DB of which the data is to be read by the magnetic element unit 42 is changed from the data band DB1 to the data band DB3.

Incidentally, in recent years, in the magnetic tape MT, as the recording capacity increases in density, there is a demand for increasing the number of the data bands DB. The number of the servo bands SB also increases with an increase in the number of the data bands DB. In this case, it is difficult to form the magnetic head 28 by providing a large number of relative displacements (that is, deviations at the predetermined intervals) between the servo patterns 58 because this affects the recording ability of the magnetic head 28. That is, the increase in the predetermined intervals leads to an increase in the width of the magnetic head 28 (that is, a length along the running direction of the magnetic tape MT). This leads to an increase in a width of a sub-gap (that is, a substrate that supports a front surface WH1A on which a gap pattern G is formed), resulting in a decrease in the recording ability. In addition, in a case of the magnetic head 28 where the relative displacement is not provided, a pulse signal generator SW4 (see FIG. 18) corresponding to the number of the servo bands SB is required, so that a current supplied to the entire magnetic head 28 increases, which leads to heat generation and/or a reduction in a distance between the servo bands SB (that is, a spacing between the servo bands SB), resulting in problems with crosstalk (that is, a phenomenon in which a magnetic field formed by a pulse current supplied to one head core WH (see FIG. 19) of the magnetic head 28 is superimposed on an adjacent head core WH2 (see FIG. 19), causing an unintended signal to be recorded). In addition, an increase in the number of devices for generating the pulse current also leads to a problem of increasing costs for production facilities.

Figure 7:
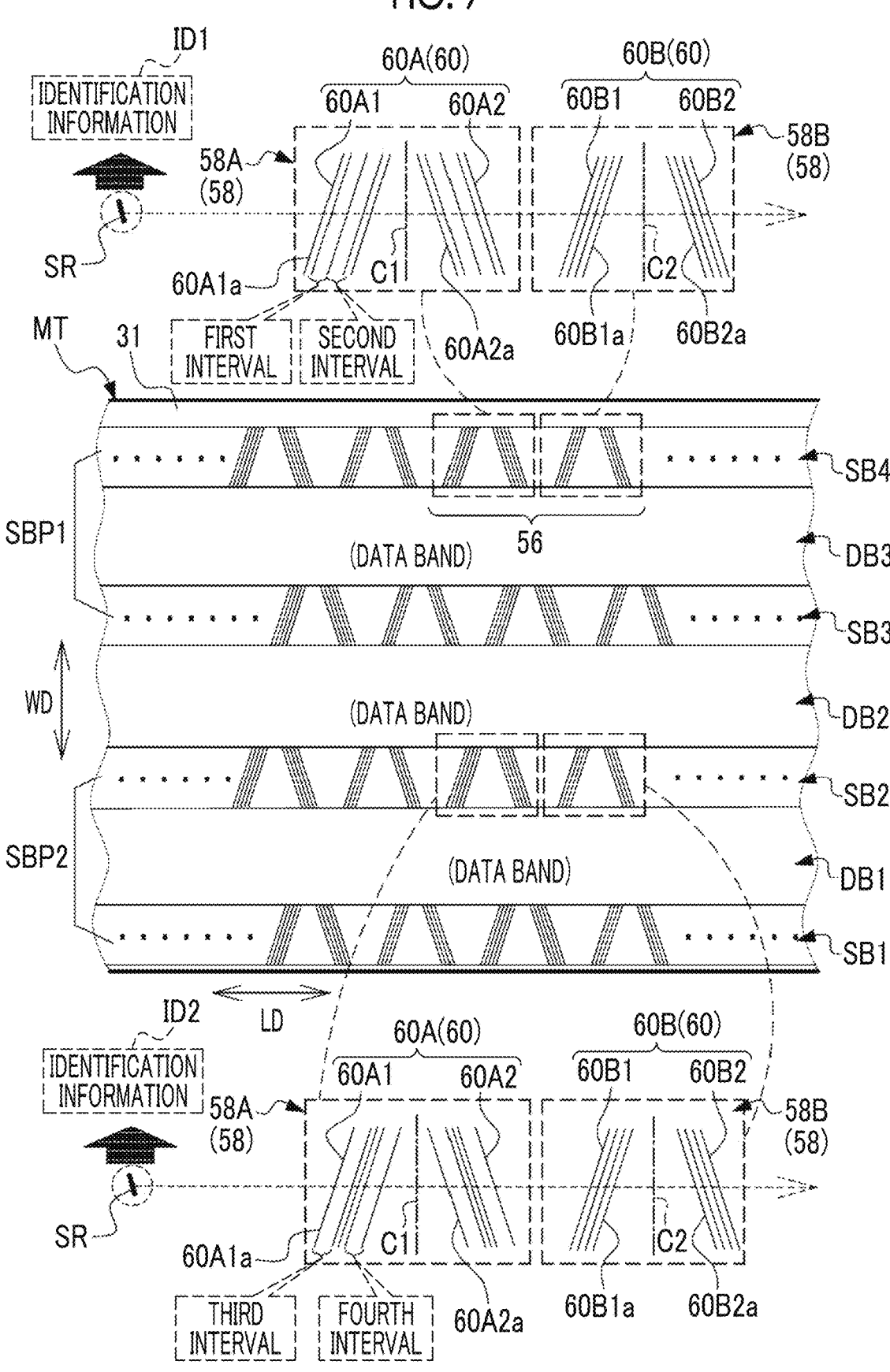
FIG. 7 is a conceptual diagram showing an example of an aspect in which the magnetic tape according to the embodiment is observed from the front surface side of the magnetic tape.

Therefore, as shown in FIG. 7 as an example, information ID (hereinafter, also simply referred to as "identification information ID") for identifying the servo band SB is embedded in each servo pattern 58. In the example shown in FIG. 7, in the servo band SB4, a pulse signal for the servo pattern 58A is modulated, so that it is possible to change, for each servo pattern 58A, an interval between the third magnetization straight line 60A1*a* and the second magnetization straight line 60A1*a* among the five magnetization straight lines 60A1*a* (hereinafter, referred to as a "first interval") and an interval between the third magnetization straight line 60A1*a* and the fourth magnetization straight line 60A1*a* (hereinafter, referred to as a "second interval"). In the example shown in FIG. 7, the first interval and the second interval are exaggerated to make it easier to visually grasp the first interval and the second interval. By making the first interval and the second interval different for each servo pattern 58A, it is possible to embed at least one bit of information for each frame 56. As a result, identification information ID1 can be embedded by combining the plurality of frames 56. As a result, in a case where the plurality of servo patterns 58 are read by the servo reading element SR, the identification information ID1 is acquired. The identification information ID and the identification information ID1 are examples of "identification information" according to the technology of the present disclosure.

In addition, although not shown, in the servo band SB3 as well, a pulse signal for the servo pattern 58A is modulated in the same manner as in the servo band SB4, so that it is possible to change the first interval and the second interval in the five magnetization straight lines 60A1*a* for each servo pattern 58A. As a result, identification information ID1 can be embedded by combining the plurality of frames 56.

Here, the servo band SB3 and the servo band SB4 form one set of servo bands SBP1. In other words, the set of servo bands SBP1 includes a pair of the servo bands SB3 and SB4. The identification information ID1 recorded in the servo pattern 58A of the servo band SB3 and the servo pattern 58A of the servo band SB4 is common.

In addition, in the example shown in FIG. 7, in the servo band SB2, a pulse signal for the servo pattern 58A is modulated, so that it is possible to change, for each servo pattern 58A, an interval between the first magnetization straight line 60A1a and the second magnetization straight line 60A1a among the five magnetization straight lines 60A1a (hereinafter, referred to as a "third interval") and an interval between the fourth magnetization straight line 60A1a and the fifth magnetization straight line 60A1a (hereinafter, referred to as a "third interval"). In the example shown in FIG. 7, the third interval and the fourth interval are exaggerated to make it easier to visually grasp the third interval and the fourth interval. By making the third interval and the fourth interval different for each servo pattern 58A, it is possible to embed at least one bit of information for each frame 56. As a result, identification information ID2 can be embedded by combining the plurality of frames 56. As a result, in a case where the plurality of servo patterns 58 are read by the servo reading element SR, the identification information ID2 is acquired. The identification information ID2 is an example of "identification information" according to the technology of the present disclosure.

In addition, although not shown, in the servo band SB1 as well, a pulse signal for the servo pattern 58A is modulated in the same manner as in the servo band SB2, so that it is possible to change the third interval and the fourth interval in the five magnetization straight lines 60A1a for each servo pattern 58A. As a result, identification information ID2 can be embedded by combining the plurality of frames 56.

The servo band SB1 and the servo band SB2 form another set of servo bands SBP2. In other words, the set of servo bands SBP2 includes a pair of the servo bands SB1 and SB2. The identification information ID2 recorded in the servo pattern 58A of the servo band SB1 and the servo pattern 58A of the servo band SB2 is common.

In addition, as described above, the identification information ID1 recorded in the servo pattern 58A of the servo band SB3 and the servo pattern 58A of the servo band SB4 is common. Further, the servo band SB3 and the servo band SB4 form the set of servo bands SBP1. Therefore, it can also be said that the identification information ID1 is information PID1 for identifying the set SBP1 (hereinafter, also simply referred to as "set identification information PID1").

In addition, as described above, the identification information ID2 recorded in the servo pattern 58A of the servo band SB1 and the servo pattern 58A of the servo band SB2 is common. Further, the servo band SB1 and the servo band SB2 form the set of servo bands SBP2. Therefore, it can also be said that the identification information ID2 is information PID2 for identifying the set SBP2 (hereinafter, also simply referred to as "set identification information PID2," and also referred to as "set identification information PID" in a case where it is not necessary to distinguish between the set identification information PID1 and the set identification information PID2). As described above, the set identification information PID is recorded in the servo pattern 58. The set identification information PID is an example of "set identification information" according to the technology of the present disclosure.

In addition, various pieces of information may be embedded in the servo pattern 58A together with the identification information ID. The various pieces of information may include, for example, information about the position in the longitudinal direction LD and/or information for specifying a manufacturer of the magnetic tape MT or the like, and in this case as well, the pulse signal is referred to.

Figure 8:
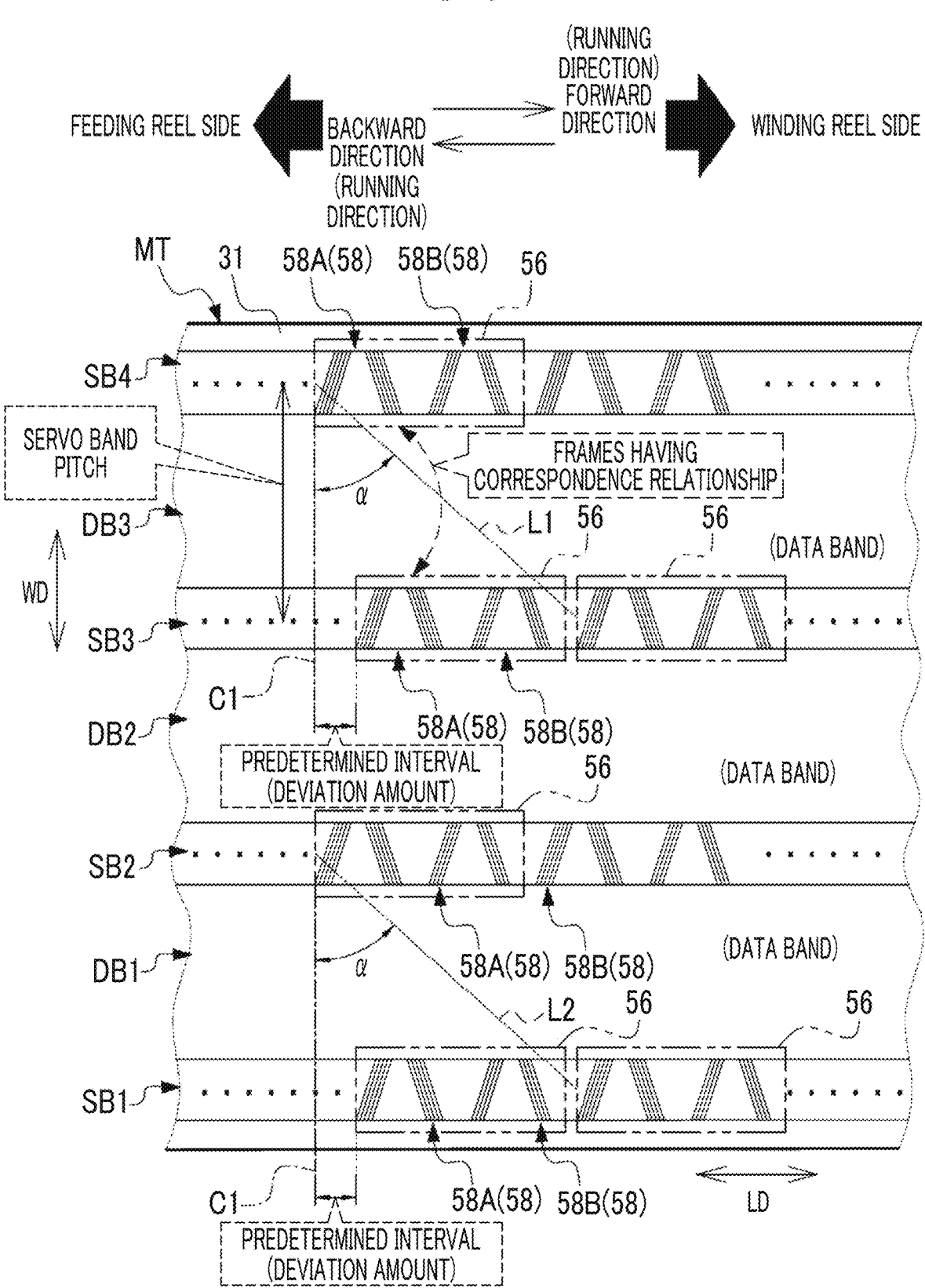
FIG. 8 is a conceptual diagram showing an example of an aspect in which a state in which frames corresponding to each other between servo bands adjacent to each other in a width direction of the magnetic tape according to the embodiment deviate from each other at a predetermined interval is observed from the front surface side of the magnetic tape.

As shown in FIG. 8 as an example, the plurality of servo bands SB are formed on the magnetic tape MT in the width direction WD, and the frames 56 having a correspondence relationship between the servo bands SB deviate from each other at a predetermined interval in the longitudinal direction LD between the servo bands SB adjacent to each other in the width direction WD. The above description means that the servo patterns 58 having a correspondence relationship between the servo bands SB deviate from each other at the predetermined interval in the longitudinal direction LD between the servo bands SB adjacent to each other in the width direction WD. The predetermined interval is a predetermined value (for example, a value determined based on the specification of the magnetic tape MT).

In the present embodiment, a predetermined form example has been shown, but the predetermined interval may be obtained as follows. For example, the predetermined interval is defined based on an angle $\alpha$, a pitch between the servo bands SB adjacent to each other in the width direction WD (hereinafter, also referred to as "servo band pitch"), and a frame length. In the example shown in FIG. 8, the angle $\alpha$ is exaggerated to make it easier to visually grasp the angle $\alpha$, but, in reality, the angle $\alpha$ is, for example, about 15 degrees. The angle $\alpha$ is an angle formed by the frames 56 having no correspondence relationship between the servo bands SB adjacent to each other in the width direction WD and the imaginary straight line C1. In the example shown in FIG. 8, as an example of the angle $\alpha$, an angle formed by an interval (in the example shown in FIG. 8, a line segment L1) between one frame 56 of a pair of the frames 56 having a correspondence relationship between the servo bands SB adjacent to each other in the width direction WD (in the example shown in FIG. 8, one frame 56 of the servo band SB3) and the frame 56 adjacent to the other frame 56 of the pair of frames 56 (in the example shown in FIG. 8, the frame 56 having a correspondence relationship with one frame 56 of the servo band SB3 among the plurality of frames 56 in the servo band SB2), and the imaginary straight line C1 is shown.

In addition, in the example shown in FIG. 8, as an example of the angle $\alpha$, an angle formed by an interval (in the example shown in FIG. 8, a line segment L2) between one frame 56 of a pair of the frames 56 having a correspondence relationship between the servo bands SB adjacent to each other in the width direction WD (in the example shown in FIG. 8, one frame 56 of the servo band SB1) and the frame 56 adjacent to the other frame 56 of the pair of frames 56 (in the example shown in FIG. 8, the frame 56 having a correspondence relationship with one frame 56 of the servo band SB3 among the plurality of frames 56 in the servo band SB4), and the imaginary straight line C1 is shown.

The frame length refers to the total length of the frame 56 with respect to the longitudinal direction LD. The predetermined interval is defined by Expression (1). It should be noted that Mod (A/B) means a remainder generated in a case where "A" is divided by "B".

$$\text{(Predetermined interval)} = \tag{1}$$
$$\text{Mod}\{(\text{Servo band pitch} \times \tan \alpha)/(\text{Frame length})\}$$

In the example shown in FIG. 8, the angle formed by the interval between one frame 56 of the pair of frames 56 having a correspondence relationship between the servo bands SB adjacent to each other in the width direction WD (hereinafter, also referred to as a "first frame") and the frame 56 adjacent to the other frame 56 of the pair of frames 56 (hereinafter, also referred to as a "second frame"), and the imaginary straight line C1 has been described as the angle α, but the technology of the present disclosure is not limited to this. For example, as the angle α, an angle formed by an interval between the first corresponding frame and the frame 56 away from the second frame by two or more frames (hereinafter, also referred to as a "third frame") in the same servo band SB as the second frame, and the imaginary straight line C1 may be used. In this case, the "frame length" used in Expression (1) is a pitch between the second frame and the third frame in the longitudinal direction LD (for example, a distance from a tip of the second frame to a tip of the third frame).

Figure 9:
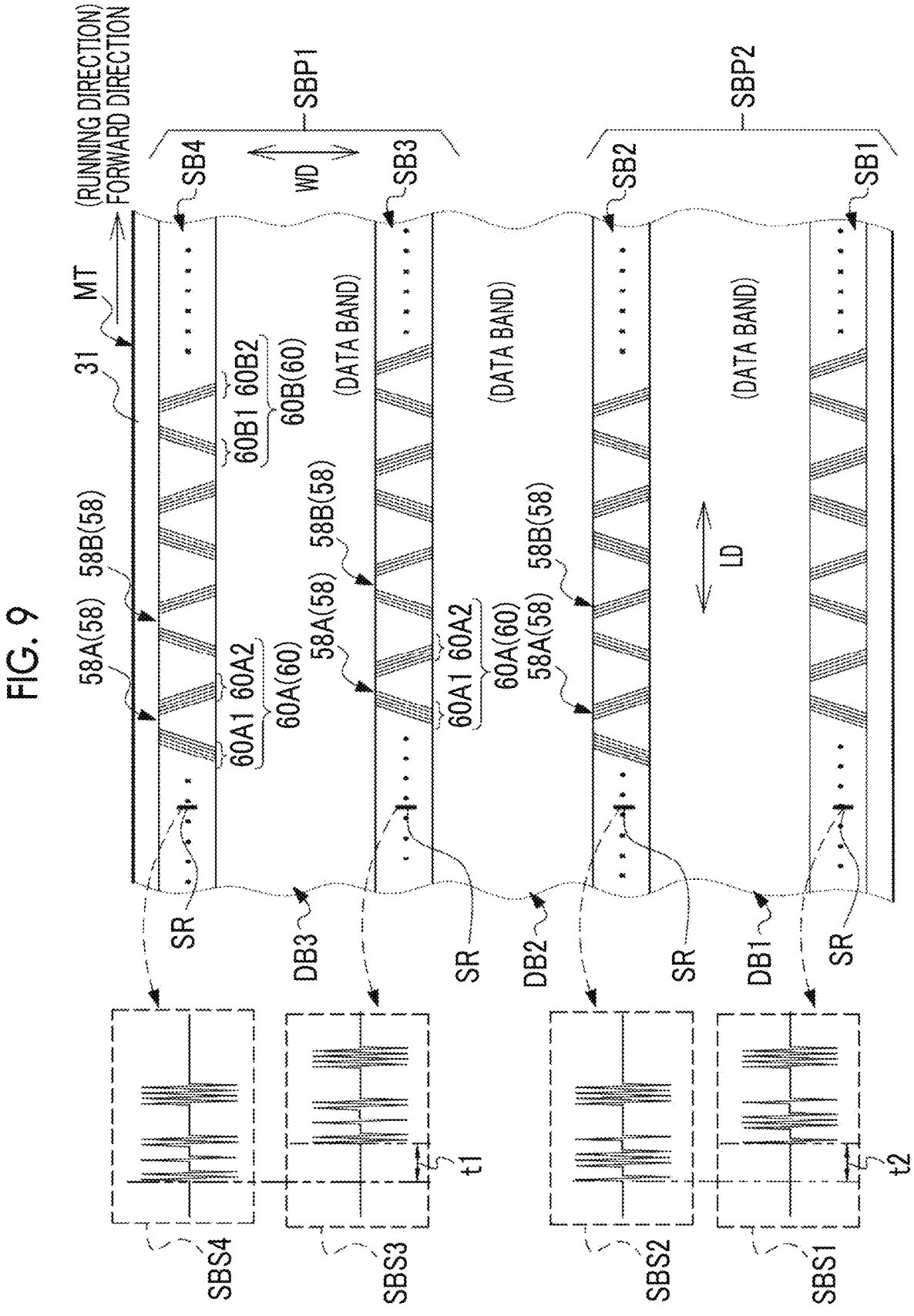
FIG. 9 is a conceptual diagram showing an example of an aspect in which a state in which a servo pattern is read by a servo reading element provided in a magnetic head on the magnetic tape according to the embodiment is observed from the front surface side of the magnetic tape.

As shown in FIG. 9 as an example, in a case where the servo patterns 58A and 58B (that is, the linear magnetization region pairs 60A and 60B) are read by the servo reading element SR, the servo signal derived from the linear magnetization regions pairs 60A and 60B is obtained. The identification information ID is recorded in the servo pattern 58A of each servo band SB as described above. In addition, as described above, the servo patterns 58 having a correspondence relationship between the servo bands SB deviate from each other at the predetermined interval in the longitudinal direction LD between the servo bands SB adjacent to each other in the width direction WD.

Therefore, the servo signal obtained as a result of reading each servo band SB reflects the identification information ID recorded in the servo pattern 58A of each servo band SB and the deviation at the predetermined interval. In the example shown in FIG. 9, the servo signal obtained as a result of reading the servo band SB4 (hereinafter, also referred to as a "fourth servo signal SBS4") and the servo signal obtained as a result of reading the servo band SB3 (hereinafter, also referred to as a "third servo signal SBS3") have different phases to reflect the deviation at the predetermined interval. Specifically, in a case where the magnetic tape MT runs in the forward direction, the fourth servo signal SBS4 is detected later than the third servo signal SBS3 by a time t1 corresponding to the predetermined interval.

In addition, the third servo signal SBS3 and the servo signal obtained as a result of reading the servo band SB2 (hereinafter, also referred to as a "second servo signal SBS2") have different phases to reflect the deviation at the predetermined interval. Specifically, in a case where the magnetic tape MT runs in the forward direction, the third servo signal SBS3 is detected earlier than the second servo signal SBS2 by the time t1 corresponding to the predetermined interval. In addition, the identification information ID1 indicated by the third servo signal SBS3 and the identification information ID2 indicated by the second servo signal SBS2 are different. Specifically, the pulse interval corresponding to the linear magnetization region pair 60A in the third servo signal SBS3 is different from the pulse interval corresponding to the linear magnetization region pair 60A in the second servo signal SBS2.

In addition, the second servo signal SBS2 and the servo signal obtained as a result of reading the servo band SB1 (hereinafter, also referred to as a "first servo signal SBS1") have different phases to reflect the deviation at the predetermined interval. Specifically, in a case where the magnetic tape MT runs in the forward direction, the first servo signal SBS1 is detected earlier than the second servo signal SBS2 by a time t2 corresponding to the predetermined interval.

Figure 10:
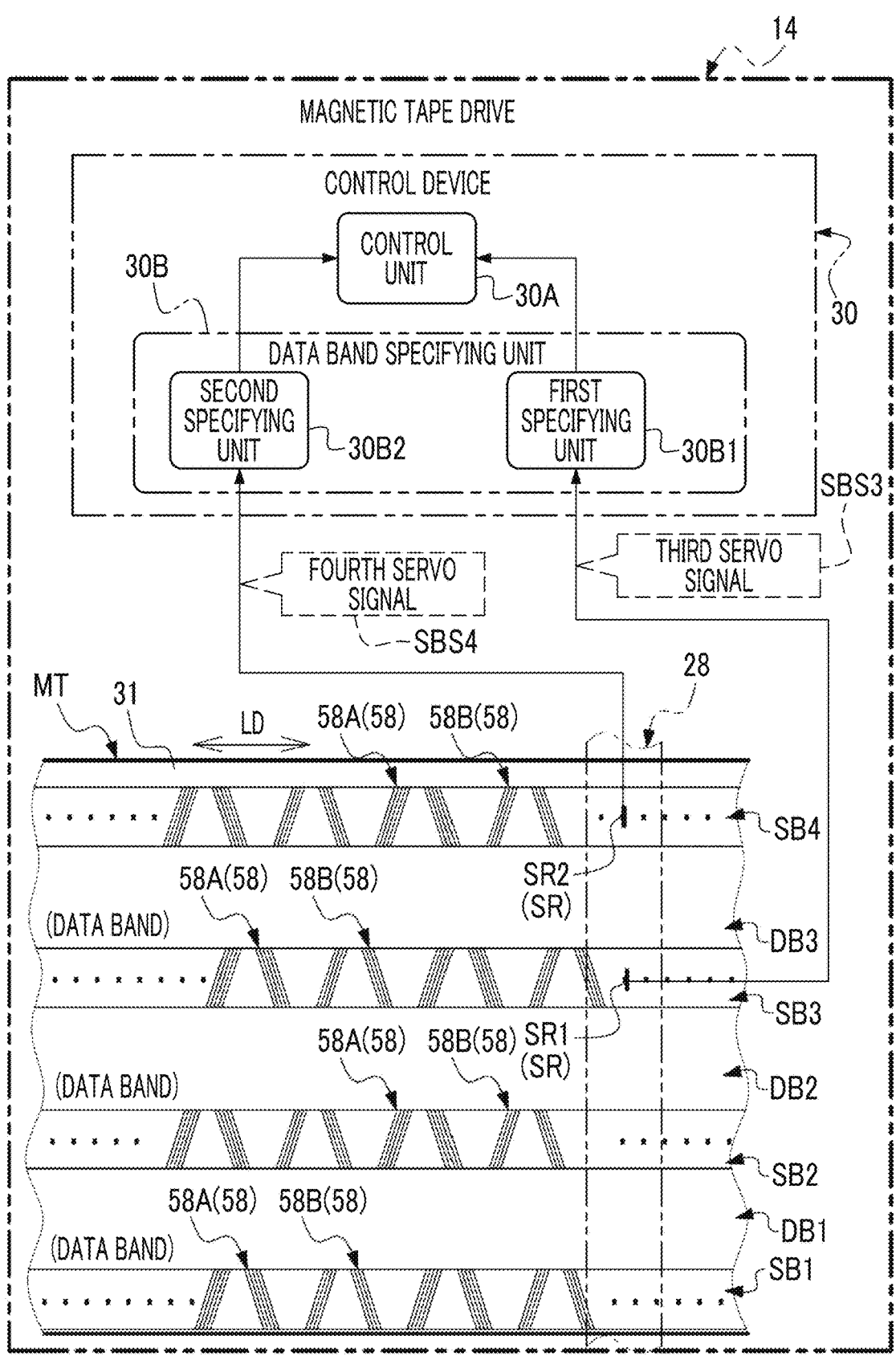
FIG. 10 is a conceptual diagram showing an example of a function of a control device provided in the magnetic tape drive according to the embodiment.

As shown in FIG. 10 as an example, the control device 30 includes a control unit 30A and a data band specifying unit

30B. The data band specifying unit 30B includes a first specifying unit 30B1 and a second specifying unit 30B2. The data band specifying unit 30B acquires the servo signal which is a result of reading the servo pattern 58 in the servo band SB by the servo reading element SR, and specifies the data band DB based on the acquired servo signal.

The first specifying unit 30B1 acquires a result of reading the servo pattern 58 by the servo reading element SR1, and the second specifying unit 30B2 acquires a result of reading the servo pattern 58 by the servo reading element SR2.

In the example shown in FIG. 10, the first specifying unit 30B1 acquires a third servo signal SBS3 obtained by reading the servo pattern 58 in the servo band SB3 by the servo reading element SR1. In addition, the second specifying unit 30B2 acquires a fourth servo signal SBS4 obtained by reading the servo pattern 58 in the servo band SB3 by the servo reading element SR2.

Figure 11:
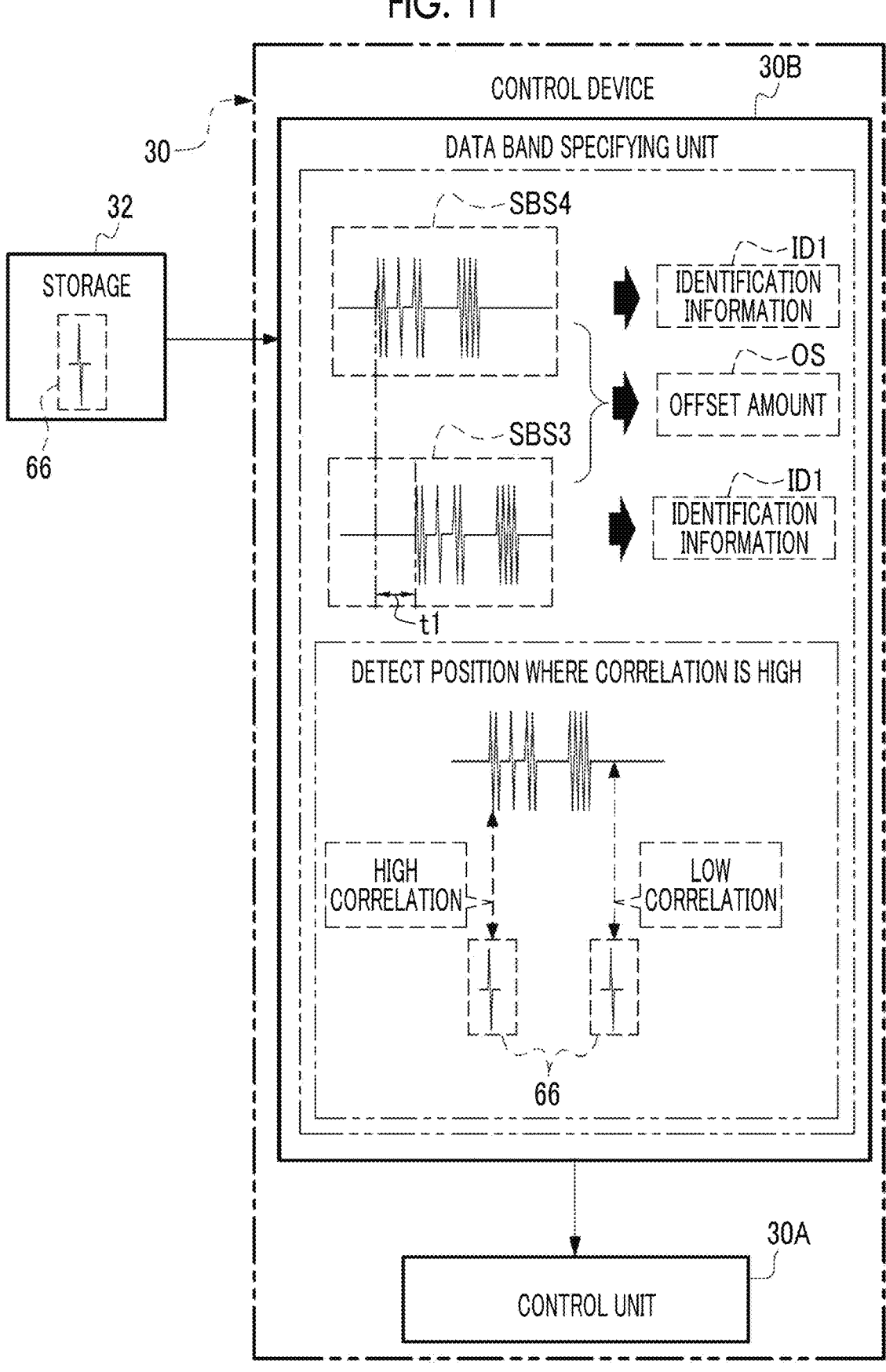
FIG. 11 is a conceptual diagram showing an example of the processing content of a data band specifying unit of a control device provided in the magnetic tape drive according to the embodiment.

As shown in FIG. 11 as an example, the data band specifying unit 30B specifies the data band DB based on the third servo signal SBS3 and the fourth servo signal SBS4 acquired by the first specifying unit 30B1 and the second specifying unit 30B2, respectively.

Specifically, the data band specifying unit 30B acquires the identification information ID from the third servo signal SBS3 and the fourth servo signal SBS4 by using an autocorrelation coefficient. In addition, the data band specifying unit 30B calculates an offset amount OS, which indicates the deviation at the predetermined interval, from the first servo signal SBS3 and the fourth servo signal SBS4 by using the autocorrelation coefficient.

An ideal waveform signal 66 is stored in the storage 32. The ideal waveform signal 66 is a signal indicating a single ideal waveform included in the servo signal (for example, an ideal signal that is a result of reading one of ideal magnetization straight lines included in the servo pattern 58 via the servo reading element SR). The ideal waveform signal 66 can be said to be a sample signal to be compared with the servo signal. Here, the form example has been described in which the ideal waveform signal 66 is stored in the storage 32, but this is merely an example. For example, the ideal waveform signal 66 may be stored in the cartridge memory 24 instead of the storage 32 or together with the storage 32. In addition, the ideal waveform signal 66 may be recorded in a BOT region (not shown) provided at the beginning of the magnetic tape MT and/or in an EOT region (not shown) provided at the end of the magnetic tape MT.

The autocorrelation coefficient used by the data band specifying unit 30B is a coefficient indicating a degree of correlation between the servo signal and the ideal waveform signal 66. The data band specifying unit 30B acquires the ideal waveform signal 66 from the storage 32 and compares the acquired ideal waveform signal 66 with the servo signal. Then, the data band specifying unit 30B calculates the autocorrelation coefficient based on the comparison result. The data band specifying unit 30B detects a position on the servo band SB where the correlation between the servo signal and the ideal waveform signal 66 is high (for example, a position where the servo signal and the ideal waveform signal 66 match) in accordance with the autocorrelation coefficient.

The identification information ID is acquired by the data band specifying unit 30B as follows, for example. As described above, in a case of recording the servo pattern 58A, the first interval and the second interval are made different for each servo pattern 58A, so that the identification information ID (that is, the set identification information PID) is embedded. Therefore, the data band specifying unit 30B acquires the identification information ID based on the pulse waveform detected in accordance with the autocorrelation coefficient. That is, the data band specifying unit 30B distinguishes the servo pattern 58 included in the servo band SB based on the shape of the pulse waveform. Then, the data band specifying unit 30B reads out the identification information ID based on the combination of the servo patterns 58 included in the servo band SB. In the example shown in FIG. 11, the identification information ID1 is read out based on the shape of the pulse waveforms indicated by the servo signals SBS3 and SBS4.

In addition, the offset amount OS is acquired by the data band specifying unit 30B as follows, for example. The third servo signal SBS3 and the fourth servo signal SBS4 have different phases to reflect the deviation at the predetermined interval. Specifically, in a case where the magnetic tape MT runs in the forward direction, the fourth servo signal SBS4 is detected later than the third servo signal SBS3 by a time t1 corresponding to the predetermined interval. Therefore, the product of the time t1 corresponding to the predetermined interval and the running speed of the magnetic tape MT is the offset amount OS.

In the example shown in FIGS. 10 and 11, the example has been described in which the third servo signal SBS3 and the fourth servo signal SBS4 are acquired by the first specifying unit 30B1 and the second specifying unit 30B2, and the identification information ID and the offset amount OS are acquired from the third servo signal SBS3 and the fourth servo signal SBS4 by using the autocorrelation coefficient, but this is merely an example.

The second servo signal SBS2 and the third servo signal SBS3 may be acquired by the first specifying unit 30B1 and the second specifying unit 30B2. In this case, in the data band specifying unit 30B, the identification information ID and the offset amount OS are acquired from the second servo signal SBS2 and the third servo signal SBS3 by using the autocorrelation coefficient.

In addition, the first servo signal SBS1 and the second servo signal SBS2 may be acquired by the first specifying unit 30B1 and the second specifying unit 30B2. In this case, in the data band specifying unit 30B, the identification information ID and the offset amount OS are acquired from the first servo signal SBS1 and the second servo signal SBS2 by using the autocorrelation coefficient.

As shown in FIG. 12 as an example, the data band specifying unit 30B specifies the data band DB by using a data band derivation table 30C. The data band derivation table 30C is a table in which the identification result and the offset amount OS of the servo band SB indicated by the identification information ID are used as input values, and the number of the data band DB is used as an output value. The data band derivation table 30C is stored in storage 32 in advance. The data band specifying unit 30B acquires the data band derivation table 30C from storage 32. The data band specifying unit 30B derives data band specification information 30D corresponding to the identification information ID and the offset amount OS from the data band derivation table 30C. The data band specification information 30D is information for specifying the data band DB. The data band specifying unit 30B outputs the data band specification information 30D to the control unit 30A. For example, the data band specification information 30D is information indicating the number of the data band DB, but this is merely an example. The data band specification information 30D may be information indicating a symbol for specifying the data band DB. Although the data band derivation table 30C is described as an example here, the technology of the present disclosure is not limited to this. For example, the number of the data band DB may be calculated by the data band specifying unit 30B using an arithmetic expression in which a value indicating the identification result of the servo band SB indicated by the identification information ID and a value indicating the offset amount OS are used as independent variables, and the number of the data band DB is used as a dependent variable.

Figure 13:
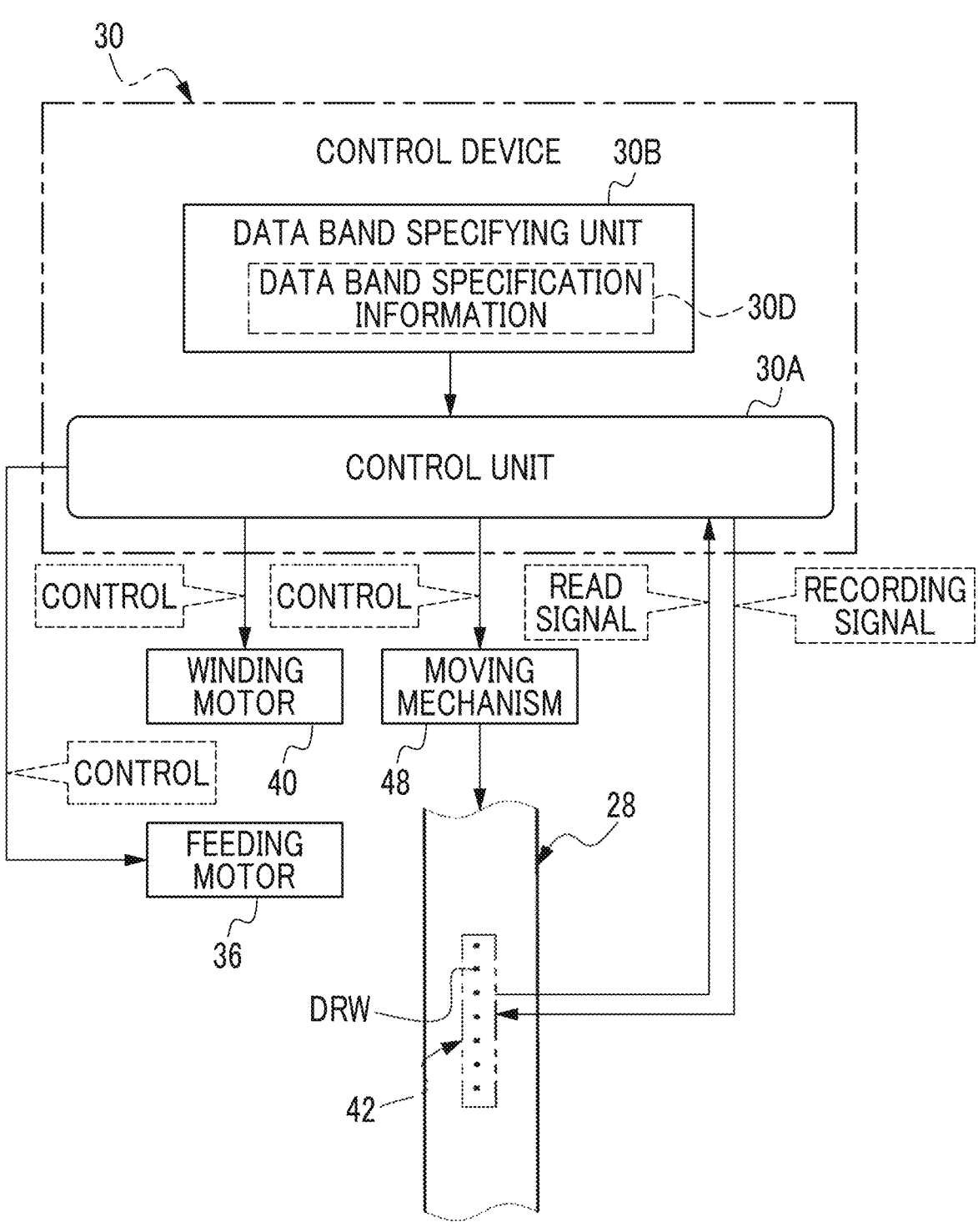
FIG. 13 is a conceptual diagram showing an example of processing content of a control unit of the control device provided in the magnetic tape drive according to the embodiment.

As shown in FIG. 13 as an example, the control unit 30A performs servo control based on the data band specification information 30D acquired from the data band specifying unit 30B. For example, the control unit 30A controls the moving mechanism 48 to move the magnetic head 28 to a position corresponding to the number of the data band DB indicated by the data band specification information 30D. By performing the servo control, the plurality of data read/write elements DRW are positioned on a designated region in the data band DB, and perform the magnetic processing on the designated region in the data band DB. That is, the control unit 30A acquires a read signal (that is, data read from the data band DB of the magnetic tape MT by the magnetic element unit 42) from the magnetic element unit 42, or supplies a recording signal to the magnetic element unit 42 to record the data in response to the recording signal in the data band DB of the magnetic tape MT.

Incidentally, in recent years, research on a technology of reducing the influence of transverse dimensional stability (TDS) has been advanced. It has been known that the TDS is affected by a temperature, humidity, a pressure at which the magnetic tape is wound around the reel, temporal deterioration, or the like, the TDS is increased in a case where no measures are taken, and off-track (that is, misregistration of the data read/write element DRW with respect to the track in the data band DB) occurs in a scene in which the magnetic processing is performed on the data band DB.

Figure 14:
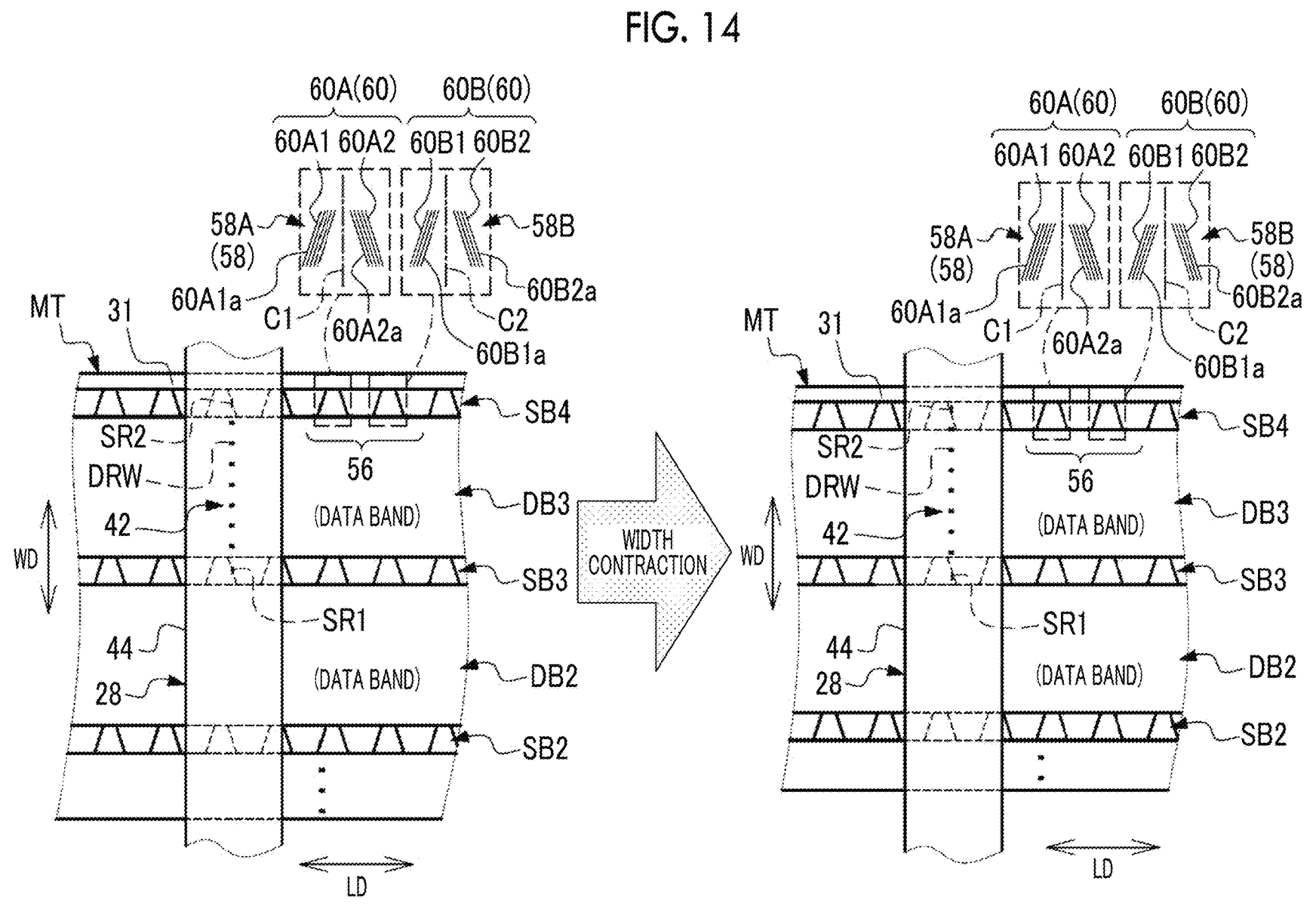

In the example shown in FIG. 14, an aspect is shown in which the width of the magnetic tape MT contracts with the elapse of time. In this case, the off-track occurs. In some cases, the width of the magnetic tape MT expands, and the off-track occurs in this case as well. That is, in a case where the width of the magnetic tape MT contracts or expands with the elapse of time, the position of the servo reading element SR with respect to the servo pattern 58 diverges in the width direction WD from a predetermined position (for example, a center position of each of the linear magnetization regions 60A1, 60A2, 60B1, and 60B2) determined in design. In a case where the position of the servo reading element SR with respect to the servo pattern 58 diverges from the predetermined position determined in design in the width direction WD, the accuracy of the servo control is deteriorated, and the position of the track in the data band DB and the position of the data read/write element DRW deviate from each other. Then, an originally planned track will not be subjected to the magnetic processing.

As a method of reducing the influence of the TDS, the control unit 30A performs various types of control based on a position detection result by a first position detection unit 30E1 (that is, a result of detecting the position by the first position detection unit 30E1) and a position detection result by the second position detection unit 30E2 (that is, a result of detecting the position by the second position detection unit 30E2). Here, the various types of control refer to, for example, servo control, skew angle control, and/or tension control. The tension control refers to control of the tension applied to the magnetic tape MT (for example, the tension for reducing the influence of the TDS).

Figure 15:
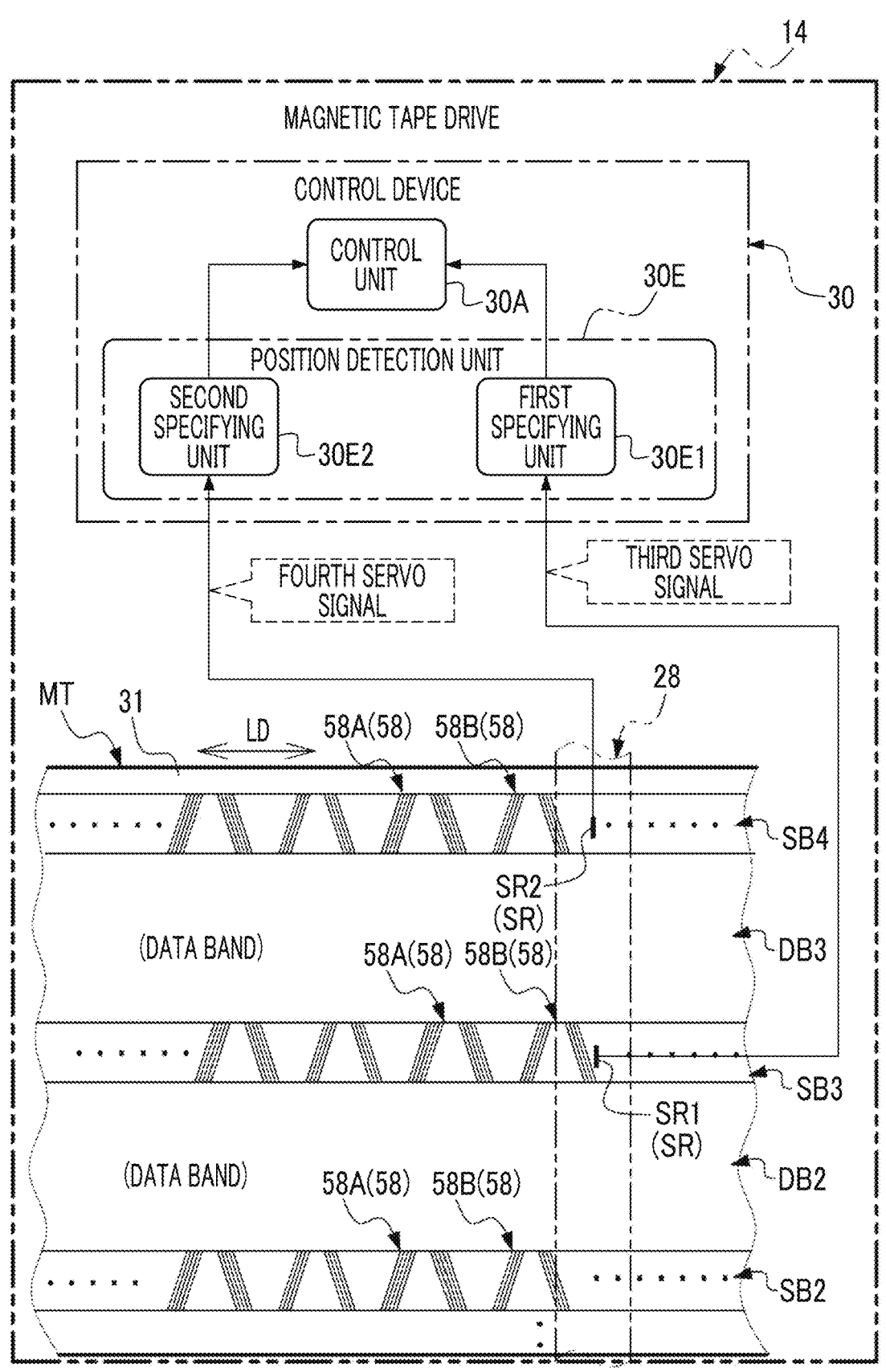
FIG. 15 is a conceptual diagram showing an example of processing contents of a position detection unit and a control unit of the control device provided in the magnetic tape drive according to the embodiment.

As shown in FIG. 15 as an example, the control device 30 includes the control unit 30A and the position detection unit 30E. The position detection unit 30E includes the first position detection unit 30E1 and the second position detection unit 30E2. The position detection unit 30E acquires the servo signal which is a result of reading the servo pattern 58 by the servo reading element SR, and detects the position of the magnetic head 28 on the magnetic tape MT based on the acquired servo signal.

Figure 16:
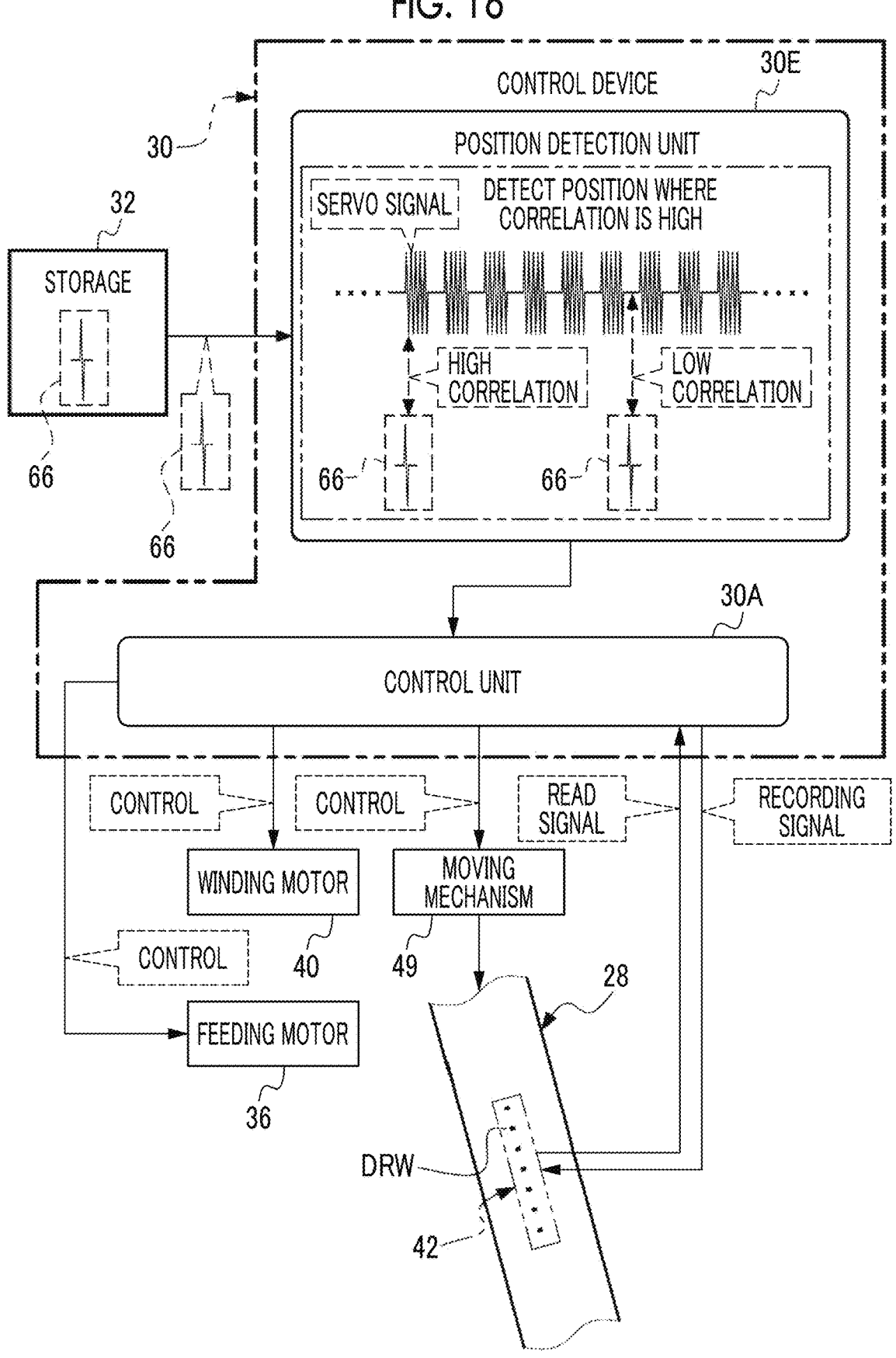
FIG. 16 is a conceptual diagram showing an example of processing contents of the position detection unit and the control unit of the control device provided in the magnetic tape drive according to the embodiment.

As shown in FIG. 16 as an example, the position detection unit 30E detects the servo signal, which is a result of reading the servo pattern 58 from the magnetic tape MT by the servo reading element SR, by using an autocorrelation coefficient.

The detection of the position of the servo reading element SR with respect to the servo band SB is performed, for example, as follows. The detection of the interval between the servo patterns 58A and 58B in the longitudinal direction LD is enabled by the autocorrelation coefficient. For example, in a case where the servo reading element SR is positioned on the upper side of the servo pattern 58 (that is, the upper side in the front view of the paper in FIG. 15), an interval between the linear magnetization region 60A1 and the linear magnetization region 60A2 is narrowed, and an interval between the linear magnetization region 60B1 and the linear magnetization region 60B2 is also narrowed. On the other hand, in a case where the servo reading element SR is positioned on the lower side of the servo pattern 58 (that is, the lower side in the front view of the paper in FIG. 15), the interval between the linear magnetization region 60A1 and the linear magnetization region 60A2 is widened, and the interval between the linear magnetization region 60B1 and the linear magnetization region 60B2 is also widened. As described above, the position detection unit 30E detects the position of the servo reading element SR with respect to the servo band SB by using the interval between the linear magnetization region 60A1 and the linear magnetization region 60A2 and the interval between the linear magnetization region 60B1 and the linear magnetization region 60B2, which are detected in accordance with the autocorrelation coefficient. The control unit 30A adjusts the position of the magnetic head 28 by operating the moving mechanism 48 based on the position detection result of the position detection unit 30E (that is, the result of detecting the position by the position detection unit 30E). In addition, the control unit 30A causes the magnetic element unit 42 to perform the magnetic processing on the data band DB of the magnetic tape MT.

In addition, in order to reduce the influence of the TDS, the control unit 30A calculates the servo band pitch from the position detection result of the position detection unit 30E, and performs the tension control in accordance with the calculated servo band pitch, or skews the magnetic head 28 on the magnetic tape MT. The tension control is implemented by adjusting the rotation speed, rotation torque, and the like of each of the feeding motor 36 and the winding motor 40. The skew of the magnetic head 28 is implemented by operating the inclination mechanism 49. The magnetic head 28 is skewed on the magnetic tape MT, so that the position of the servo reading element SR with respect to the servo pattern 58 is held at a predetermined position determined in design.

Figure 17:
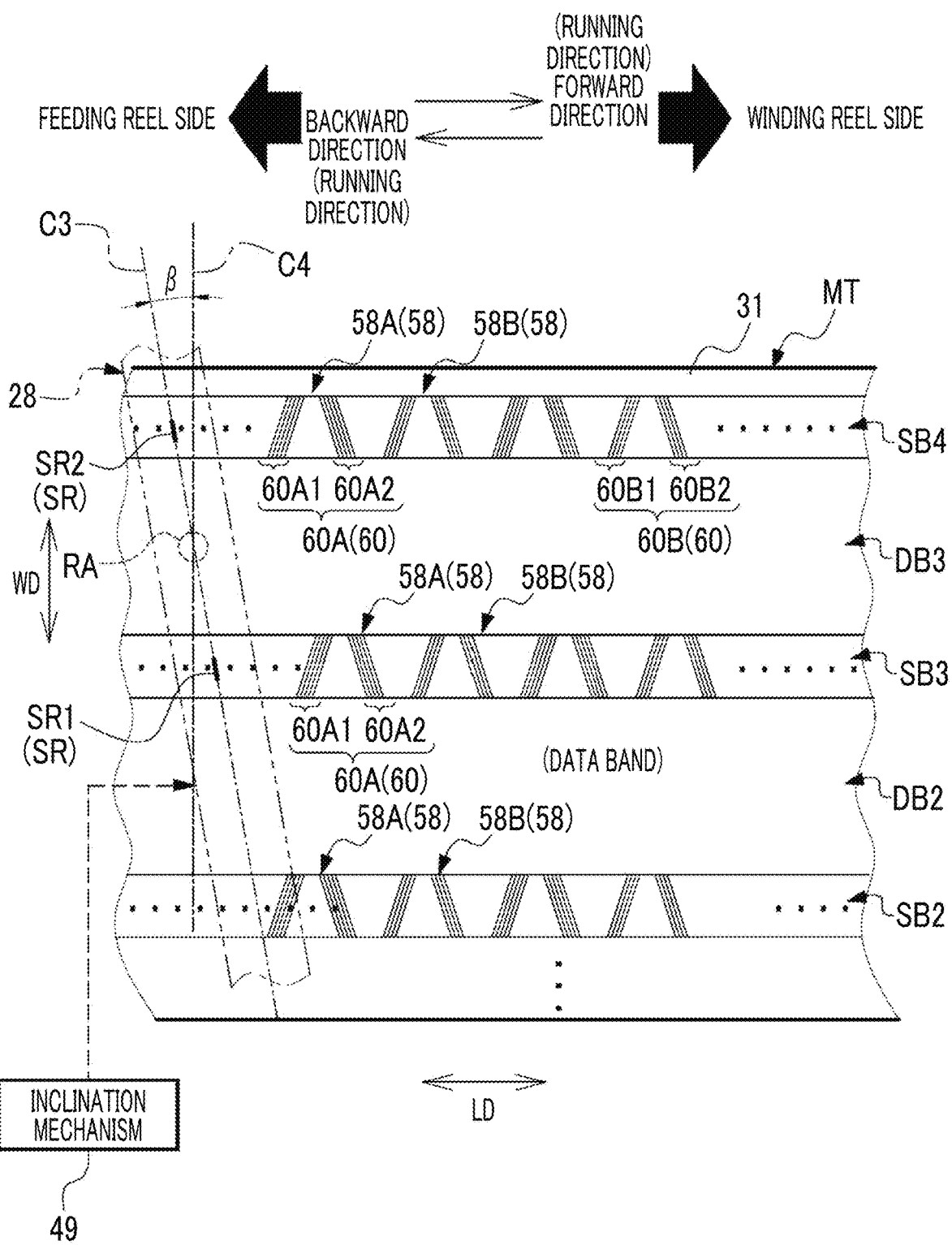
FIG. 17 is a conceptual diagram showing an example of an aspect in which a state in which the servo pattern is read by the servo reading element provided in the magnetic head that is skewed on the magnetic tape according to the embodiment is observed from the front surface side of the magnetic tape.

As shown in FIG. 17 as an example, the magnetic head 28 comprises a rotation axis RA. The rotation axis RA is provided at a position corresponding to a center portion of the magnetic element unit 42 provided in the magnetic head 28 in a plan view. The magnetic head 28 is rotatably held by the inclination mechanism 49 via the rotation axis RA. An imaginary straight line C3 which is an imaginary center line is provided in the magnetic head 28. The imaginary straight line C3 is a straight line that passes through the rotation axis RA and that extends in the longitudinal direction of the magnetic head 28 in a plan view (that is, the direction in which the plurality of data read/write elements DRW are arranged). The magnetic head 28 is held by the inclination mechanism 49 to have a posture in which the imaginary straight line C3 is inclined to the longitudinal direction side of the magnetic tape MT with respect to the imaginary straight line C4 which is an imaginary straight line along the width direction WD.

In the example shown in FIG. 17, the magnetic head 28 is held by the inclination mechanism 49 in a posture in which the imaginary straight line C3 is inclined to the feeding reel 22 side with respect to the imaginary straight line C4 (that is, a posture inclined counterclockwise as viewed from a paper surface side of FIG. 17).

The inclination mechanism 49 receives power from the inclination actuator 49A (see FIG. 5) to rotate the magnetic head 28 around the rotation axis RA on the front surface 31 of the magnetic tape MT. Under the control of the control device 30, the inclination mechanism 49 rotates the magnetic head 28 around the rotation axis RA on the front surface 31 of the magnetic tape MT, thereby changing the direction of the inclination (that is, azimuth) and the inclined angle of the imaginary straight line C3 with respect to the imaginary straight line C4.

By changing the direction of the inclination and the inclined angle $\beta$ of the imaginary straight line C3 with respect to the imaginary straight line C4 in accordance with the temperature, the humidity, the pressure at which the magnetic tape MT is wound around the reel, the temporal deterioration, and the like, or expansion and contraction of the magnetic tape MT in the width direction WD due to these, the position of the servo reading element SR with respect to the servo pattern 58 is held at the predetermined position determined in design.

Next, among a plurality of steps included in a manufacturing process of the magnetic tape MT, an example of a servo pattern recording step of recording the servo pattern 58 on the servo band SB of the magnetic tape MT and an example of a winding step of winding the magnetic tape MT will be described. In the present embodiment, the servo pattern recording step is an example of a "manufacturing method of a magnetic tape" according to the technology of the present disclosure.

Figure 18:
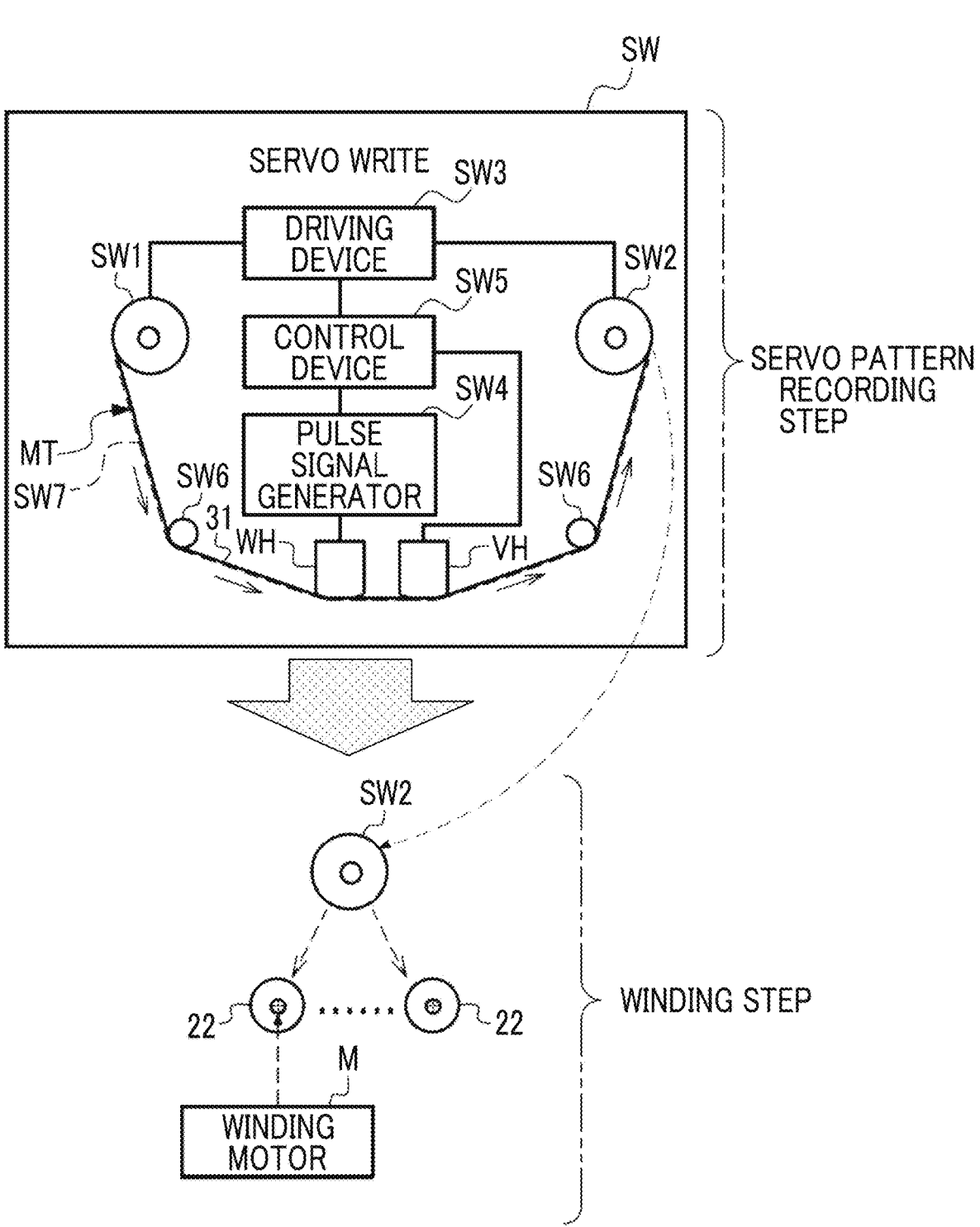
FIG. 18 is a conceptual diagram showing an example of a configuration of a servo writer according to the embodiment.

As an example, as shown in FIG. 18, a servo writer SW is used in the servo pattern recording step. The servo writer SW comprises a feeding reel SW1, a winding reel SW2, a driving device SW3, a pulse signal generator SW4, a control device SW5, a plurality of guides SW6, a transport passage SW7, a servo pattern recording head WH, and a verification head VH.

In the present embodiment, the servo writer SW is an example of a "servo pattern recording device" according to the technology of the present disclosure. In addition, in the present embodiment, the servo pattern recording head WH is an example of a "servo pattern recording head" according to the technology of the present disclosure.

The control device SW5 controls the entire servo writer SW. In the present embodiment, although the control device SW5 is implemented by an ASIC, the technology of the present disclosure is not limited to this. For example, the control device SW5 may be implemented by an FPGA and/or a PLC. In addition, the control device SW5 may be implemented by the computer including a CPU, a flash memory (for example, an EEPROM and/or an SSD), and a RAM. In addition, the control device SW5 may be implemented by combining two or more of an ASIC, an FPGA, a PLC, and a computer. That is, the control device SW5 may be implemented by a combination of a hardware configuration and a software configuration.

A pancake is set in the feeding reel SW1. The pancake refers to a large-diameter roll in which the magnetic tape MT cut into a product width from a wide web raw material before writing the servo pattern 58 is wound around a hub.

The driving device SW3 has a motor (not shown) and a gear (not shown), and is mechanically connected to the feeding reel SW1 and the winding reel SW2. In a case where the magnetic tape MT is wound by the winding reel SW2, the driving device SW3 generates power in accordance with instructions from the control device SW5, and transmits the generated power to the feeding reel SW1 and the winding reel SW2 to rotate the feeding reel SW1 and the winding reel SW2. That is, the feeding reel SW1 receives the power from the driving device SW3 and rotates to feed the magnetic tape MT to the predetermined transport passage SW7. The winding reel SW2 receives the power from the driving device SW3 and rotates to wind the magnetic tape MT fed from the feeding reel SW1. The rotation speed, the rotation torque, and the like of the feeding reel SW1 and the winding reel SW2 are adjusted in accordance with a speed at which the magnetic tape MT is wound around the winding reel SW2.

The plurality of guides SW6 and the servo pattern recording head WH are disposed on the transport passage SW7. The servo pattern recording head WH is disposed on the front surface 31 side of the magnetic tape MT between the plurality of guides SW6. The magnetic tape MT fed from the feeding reel SW1 to the transport passage SW7 is guided by the plurality of guides SW6 and is wound by the winding reel SW2 via the servo pattern recording head WH.

A manufacturing process of the magnetic tape MT includes a plurality of steps in addition to the servo pattern recording step. The plurality of steps include an inspection step and a winding step.

For example, the inspection step is a step of inspecting the servo band SB formed on the front surface 31 of the magnetic tape MT by the servo pattern recording head WH. The inspection of the servo band SB refers to, for example, processing of determining whether the servo pattern 58 recorded on the servo band SB is correct or not. The determination of the correctness of the servo pattern 58 refers to, for example, a determination (that is, verification of the servo pattern 58) whether or not the servo patterns 58A and 58B are recorded in a predetermined portion of the front surface 31 without excess or deficiency of the magnetization straight lines 60A1a, 60A2a, 60B1a, and 60B2a and within an allowable error.

The inspection step is performed by using the control device SW5 and the verification head VH. The verification head VH is disposed on the downstream side of the servo pattern recording head WH in a transport direction of the magnetic tape MT. In addition, similarly to the magnetic head 28, the verification head VH includes a plurality of servo reading elements (not shown), and the plurality of servo bands SB are read by the plurality of servo reading elements.

The verification head VH is connected to the control device SW5. The verification head VH is disposed at a position facing the servo band SB as viewed from the front surface 31 side of the magnetic tape MT (that is, a rear surface side of the verification head VH), and reads the servo pattern 58 recorded on the servo band SB and outputs the reading result (hereinafter, referred to as "servo pattern reading result") to the control device SW5. The control device SW5 inspects the servo band SB (for example, determines whether the servo pattern 58 is correct or not) based on the servo pattern reading result (for example, the servo signal) input from the verification head VH. For example, the control device SW5 operates as the position detection unit 30E shown in FIG. 15 to acquire the position detection result from the servo pattern reading result, and inspects the servo band SB by determining whether the servo pattern 58 is correct or not by using the position detection result.

The control device SW5 outputs information indicating the result obtained by inspecting the servo band SB (for example, the result obtained by determining whether the servo pattern 58 is correct or not) to a predetermined output destination (for example, the storage 32 (see FIG. 3), the UI system device 34 (see FIG. 3), and/or the external device 37 (see FIG. 3)).

For example, in a case where the inspection step is ended, the winding step is then performed. The winding step is a step of winding the magnetic tape MT around the feeding reel 22 (that is, the feeding reel 22 (see FIGS. 2 to 4) accommodated in the magnetic tape cartridge 12 (see FIGS. 1 to 4)) used for each of a plurality of the magnetic tape cartridges 12 (see FIGS. 1 to 4). In the winding step, a winding motor M is used. The winding motor M is mechanically connected to the feeding reel 22 via a gear and the like. The winding motor M rotates the feeding reel 22 by applying a rotational force to the feeding reel 22 under the control of the control device (not shown). The magnetic tape MT wound around the winding reel SW2 is wound around the feeding reel 22 by the rotation of the feeding reel 22. In the winding step, a cutting device (not shown) is used. In a case where a required amount of the magnetic tape MT is wound around the feeding reel 22 for each of the plurality of feeding reels 22, the magnetic tape MT fed from the winding reel SW2 to the feeding reel 22 is cut by the cutting device.

The pulse signal generator SW4 generates the pulse current under the control of the control device SW5, and supplies the generated pulse current to the servo pattern recording head WH. In a state in which the magnetic tape MT runs on the transport passage SW7 at a constant speed, the servo pattern recording head WH records the servo pattern 58 on the servo band SB in response to the pulse current supplied from the pulse signal generator SW4.

Figure 19:
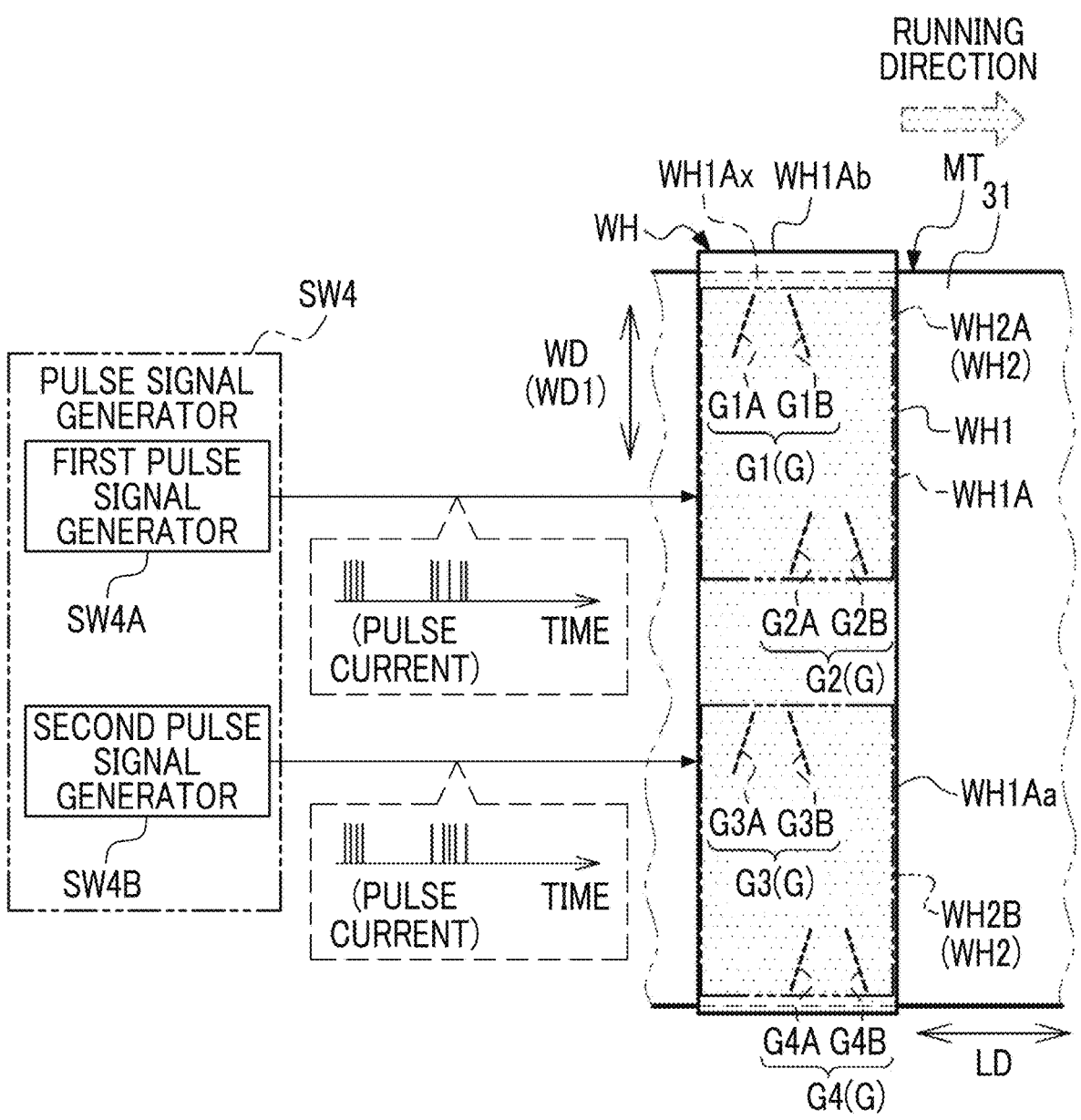
FIG. 19 is a conceptual diagram showing an example of a relationship between a pulse signal generator and a servo pattern recording head provided in the servo writer according to the embodiment, and an example of an aspect in which a state in which the servo pattern recording head provided in the servo writer according to the embodiment is disposed on the magnetic tape is observed from the front surface side of the magnetic tape (that is, a rear surface side of the servo pattern recording head)

FIG. 19 shows an example of a configuration of the servo pattern recording head WH and an example of a configuration of the pulse signal generator SW4 in a case where the servo pattern recording head WH is observed from the front surface 31 side (that is, the rear surface side of the servo pattern recording head WH) of the magnetic tape MT that runs on the transport passage SW7 (see FIG. 18).

As shown in FIG. 19 as an example, the servo pattern recording head WH includes a substrate WH1 and a plurality of head cores WH2. The substrate WH1 is formed in a rectangular parallelepiped shape, and is disposed to cross the front surface 31 of the magnetic tape MT that runs on the transport passage SW7 along the width direction WD. A front surface WH1A of the substrate WH1 is a rectangle having a long side WH1Aa and a short side WH1Ab. In the present embodiment, the plurality of head cores WH2 are an example of a "plurality of head cores" according to the technology of the present disclosure.

The front surface WH1A has a sliding surface WH1Ax. The sliding surface WH1Ax is a surface overlapping the front surface 31 of the magnetic tape MT in the front surface WH1A under a situation in which the substrate WH1 diagonally crosses the front surface 31 of the magnetic tape MT along the width direction WD (for example, a dot-shaped hatching region shown in FIG. 19), and slides on the magnetic tape MT in the running state. A width of the sliding surface WH1Ax shown in FIG. 19 (that is, a length of the short side WH1Ab) is merely an example, and the width of the sliding surface WH1Ax may be several times wider than the example shown in FIG. 19.

The plurality of head cores WH2 are incorporated in the substrate WH1 along the direction of the long side WH1Aa. The plurality of head cores WH2 are magnetically separated. For example, a non-magnetic layer (for example, a ceramic layer) is formed between the plurality of head cores WH2. As a result, the magnetic fields generated in the adjacent head cores WH2 are prevented from interfering with each other.

A gap pattern G is formed in the head core WH2. The gap pattern G is formed on the front surface WH1A (that is, the surface of the substrate WH1 that faces the front surface 31 of the magnetic tape MT). In addition, the gap pattern G consists of a pair of non-parallel straight line regions. The pair of non-parallel straight line regions refers to, for example, a straight line region having the same geometrical characteristic as the geometrical characteristic of the magnetization straight line 60A1a positioned on the most upstream side in the forward direction among the five magnetization straight lines 60A1a included in the linear magnetization region 60A1 shown in FIG. 7, and a straight line region having the same geometrical characteristic as the geometrical characteristic of the magnetization straight line 60A2a positioned on the most upstream side in the forward direction among the five magnetization straight lines 60A2a included in the linear magnetization region 60A2 shown in FIG. 7.

A plurality of the gap patterns G are formed on the front surface WH1A along a direction WD1. On the front surface WH1A, an interval in the direction WD1 between the gap patterns G which are adjacent to each other in the direction WD1 corresponds to the interval the width direction WD between the servo bands SB of the magnetic tape MT (that is, the servo band pitch).

A coil (not shown) is wound around the head core WH2, and the pulse current is supplied to the coil. The pulse current supplied to the coil is the pulse current for the servo pattern 58A and the pulse current for the servo pattern 58B.

In a case where the pulse current for the servo pattern 58A is supplied to the coil of the head core WH2 in a state in which the gap pattern G faces the magnetic tape MT running on the transport passage SW7, the magnetic field is applied to the magnetic tape MT from the gap pattern G in response to the pulse current. As a result, the servo pattern 58A is recorded on the magnetic tape MT. In addition, the pulse current for the servo pattern 58B is supplied to the coil of the head core WH2 in a state in which the gap pattern G faces the magnetic tape MT running on the transport passage SW7, whereby the magnetic field is applied to the magnetic tape MT from the gap pattern G in response to the pulse current. As a result, the servo pattern 58B is recorded on the magnetic tape MT.

Here, information indicated by the pulse current supplied to head core WH2A includes identification information ID. As described above, the pulse current corresponding to each servo pattern 58 (that is, the servo pattern 58 for each frame 56 (see FIG. 7)) is modulated. The pulse signal is modulated to embed the identification information ID in the pulse current.

In the example shown in FIG. 19, head cores WH2A and WH2B are shown as an example of the plurality of head cores WH2, and gap patterns G1, G2, G3, and G4 are shown as an example of the plurality of gap patterns G. The gap pattern G1 and the gap pattern G2 are formed on the head core WH2A. The gap pattern G3 and the gap pattern G4 are formed on the head core WH2B. In the present embodiment, the gap patterns G1 to G4 are examples of a "plurality of gap patterns" according to the technology of the present disclosure.

The gap patterns G1 to G4 has the same geometrical characteristics as each other. In the present embodiment, for example, the gap pattern G1 is used for recording the servo pattern 58 (see FIG. 9) on the servo band SB4 (see FIG. 9). The gap pattern G2 is used for recording the servo pattern 58 (see FIG. 9) on the servo band SB3 (see FIG. 9). The gap pattern G3 is used for recording the servo pattern 58 (see FIG. 9) on the servo band SB2 (see FIG. 9). The gap pattern G4 is used for recording the servo pattern 58 (see FIG. 9) on the servo band SB1 (see FIG. 9).

The gap pattern G1 is a straight line region pair consisting of straight line regions G1A and G1B. In addition, the gap pattern G2 is a straight line region pair consisting of straight line regions G2A and G2B. In addition, the gap pattern G3 is a straight line region pair consisting of straight line regions G3A and G3B. In addition, the gap pattern G4 is a straight line region pair consisting of straight line regions G4A and G4B.

The pulse signal generator SW4 includes a first pulse signal generator SW4A and a second pulse signal generator SW4B. The first pulse signal generator SW4A is connected to the head core WH2A. The second pulse signal generator SW4B is connected to the head core WH2B. In the present embodiment, the first pulse signal generator SW4A and the second pulse signal generator SW4B are examples of a "pulse signal generator" according to the technology of the present disclosure.

In a case where the gap pattern G1 is used for the servo band SB4 (see FIG. 9), in a case where the first pulse signal generator SW4A supplies the pulse current to the head core WH2A, the magnetic field is applied to the magnetic tape MT from the gap pattern G1 in response to the pulse current, and the servo pattern 58 (see FIG. 9) is recorded on the magnetic tape MT.

For example, in a case where the pulse current for the servo pattern 58A is supplied to the head core WH2A in a state in which the gap pattern G1 faces the magnetic tape MT running on the transport passage SW7, the servo pattern 58A (see FIG. 9) is recorded on the magnetic tape MT. That is, the linear magnetization region 60A1 (see FIG. 9) is recorded on the magnetic tape MT by the straight line region G1A, and the linear magnetization region 60A2 (see FIG. 9) is recorded on the magnetic tape MT by the straight line region G1B.

In addition, for example, in a case where the pulse current for the servo pattern 58B is supplied to the head core WH2A in a state in which the gap pattern G1 faces the magnetic tape MT running on the transport passage SW7, the servo pattern 58B (see FIG. 9) is recorded on the magnetic tape MT. That is, the linear magnetization region 60B1 (see FIG. 9) is recorded on the magnetic tape MT by the straight line region G1A, and the linear magnetization region 60B2 (see FIG. 9) is recorded on the magnetic tape MT by the straight line region G1B.

In a case where the gap pattern G2 is used for the servo band SB3 (see FIG. 9), in a case where the first pulse signal generator SW4A supplies the pulse current to the head core WH2A, the magnetic field is applied to the magnetic tape MT from the gap pattern G2 in response to the pulse current, and the servo patterns 58 are recorded on the magnetic tape MT.

For example, in a case where the pulse current for the servo pattern 58A is supplied to the head core WH2A in a state in which the gap pattern G2 faces the magnetic tape MT running on the transport passage SW7, the servo pattern 58A (see FIG. 9) is recorded on the magnetic tape MT. That is, the linear magnetization region 60A1 is recorded on the magnetic tape MT by the straight line region G2A, and the linear magnetization region 60A2 is recorded on the magnetic tape MT by the straight line region G2B.

In addition, for example, in a case where the pulse current for the servo pattern 58B is supplied to the head core WH2A in a state in which the gap pattern G2 faces the magnetic tape MT running on the transport passage SW7, the servo pattern 58B is recorded on the magnetic tape MT. That is, the linear magnetization region 60B1 is recorded on the magnetic tape MT by the straight line region G2A, and the linear magnetization region 60B2 is recorded on the magnetic tape MT by the straight line region G2B.

In a case where the gap pattern G3 is used for the servo band SB2 (see FIG. 9), in a case where the second pulse signal generator SW4B supplies the pulse current to the head core WH2B, the magnetic field is applied to the magnetic tape MT from the gap pattern G3 in response to the pulse current, and the servo patterns 58 are recorded on the magnetic tape MT.

For example, in a case where the pulse current for the servo pattern 58A is supplied to the head core WH2B in a state in which the gap pattern G3 faces the magnetic tape MT running on the transport passage SW7, the servo pattern 58A is recorded on the magnetic tape MT. That is, the linear magnetization region 60A1 is recorded on the magnetic tape MT by the straight line region G3A, and the linear magnetization region 60A2 is recorded on the magnetic tape MT by the straight line region G3B.

In addition, for example, in a case where the pulse current for the servo pattern 58B is supplied to the head core WH2B in a state in which the gap pattern G3 faces the magnetic tape MT running on the transport passage SW7, the servo pattern 58B is recorded on the magnetic tape MT. That is, the linear magnetization region 60B1 is recorded on the magnetic tape MT by the straight line region G3A, and the linear magnetization region 60B2 is recorded on the magnetic tape MT by the straight line region G3B.

In a case where the gap pattern G4 is used for the servo band SB1 (see FIG. 9), in a case where the second pulse signal generator SW4B supplies the pulse current to the head core WH2B, the magnetic field is applied to the magnetic tape MT from the gap pattern G4 in response to the pulse current, and the servo patterns 58 are recorded on the magnetic tape MT.

For example, in a case where the pulse current for the servo pattern 58A is supplied to the head core WH2B in a state in which the gap pattern G4 faces the magnetic tape MT running on the transport passage SW7, the servo pattern 58A is recorded on the magnetic tape MT. That is, the linear magnetization region 60A1 is recorded on the magnetic tape MT by the straight line region G4A, and the linear magnetization region 60A2 is recorded on the magnetic tape MT by the straight line region G4B.

In addition, for example, in a case where the pulse current for the servo pattern 58B is supplied to the head core WH2B in a state in which the gap pattern G4 faces the magnetic tape MT running on the transport passage SW7, the servo pattern 58B is recorded on the magnetic tape MT. That is, the linear magnetization region 60B1 is recorded on the magnetic tape MT by the straight line region G4A, and the linear magnetization region 60B2 is recorded on the magnetic tape MT by the straight line region G4B.

Figure 20:
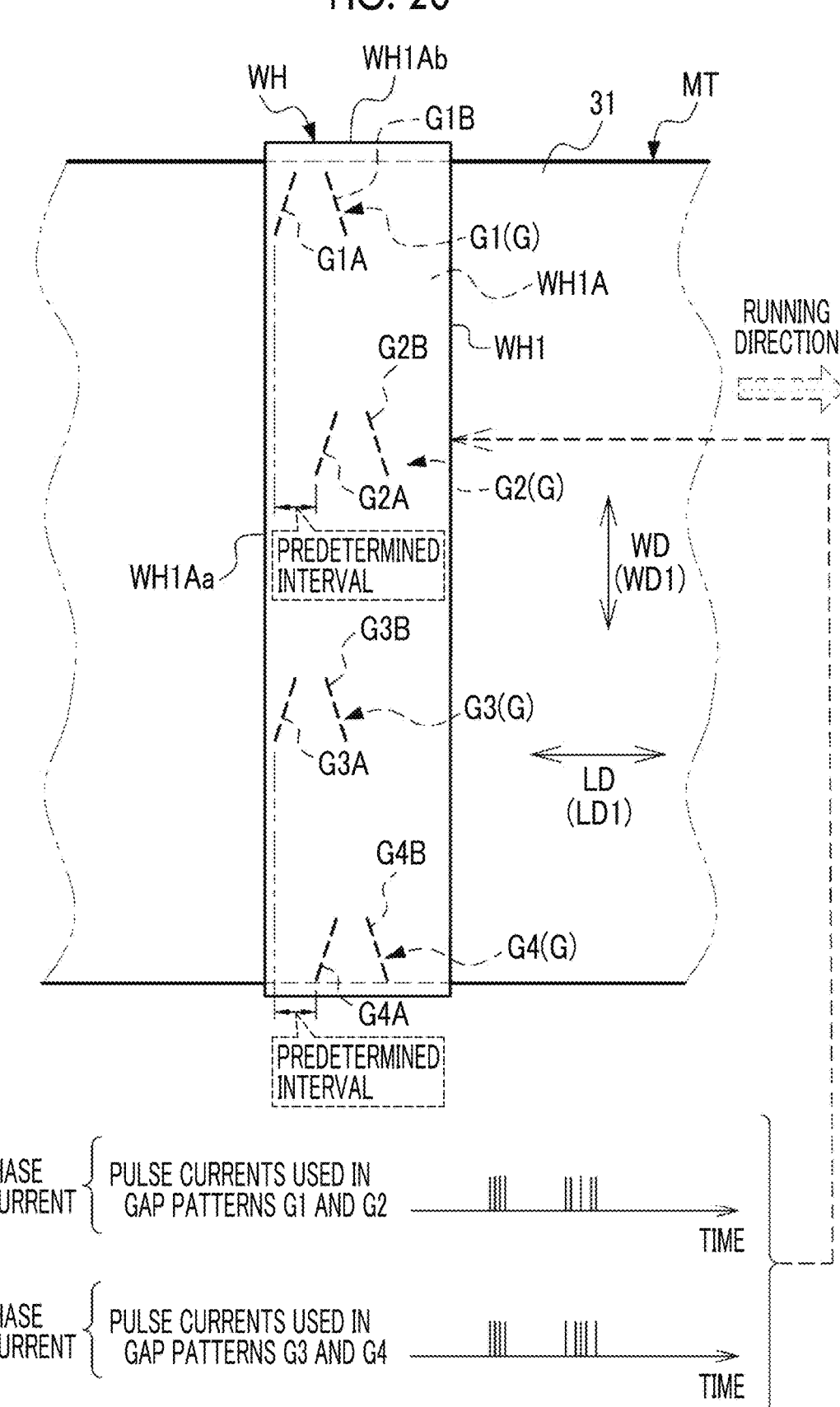
FIG. 20 is a conceptual diagram showing an example of an aspect in which a state in which the servo pattern recording head provided in the servo writer according to the embodiment is disposed on the magnetic tape is observed

As shown in FIG. 20 as an example, in the gap pattern G1, the straight line regions G1A and G1B are inclined in opposite directions with respect to the imaginary straight line C2, which is an imaginary straight line along the width direction WD. The straight line regions G1A and G1B are inclined line-symmetrically with respect to the imaginary straight line C2. More specifically, the straight line regions G1A and G1B are formed in a state of being not parallel to each other and being inclined at a predetermined angle (for example, 5 degrees) in opposite directions on the longitudinal direction LD side of the magnetic tape MT with the imaginary straight line C2 as a symmetry axis.

In the gap pattern G2, the straight line regions G2A and G2B are inclined in opposite directions with respect to the imaginary straight line C2, which is an imaginary straight line along the width direction WD. The straight line regions G2A and G2B are inclined line-symmetrically with respect to the imaginary straight line C2. More specifically, the straight line regions G2A and G2B are formed in a state of being not parallel to each other and being inclined at a predetermined angle (for example, 5 degrees) in opposite directions on the longitudinal direction LD side of the magnetic tape MT with the imaginary straight line C2 as a symmetry axis.

In the gap pattern G3, the straight line regions G3A and G3B are inclined in opposite directions with respect to the imaginary straight line C2, which is an imaginary straight line along the width direction WD. The straight line regions G3A and G3B are inclined line-symmetrically with respect to the imaginary straight line C2. More specifically, the straight line regions G3A and G3B are formed in a state of being not parallel to each other and being inclined at a predetermined angle (for example, 5 degrees) in opposite directions on the longitudinal direction LD side of the magnetic tape MT with the imaginary straight line C2 as a symmetry axis.

In the gap pattern G4, the straight line regions G4A and G4B are inclined in opposite directions with respect to the imaginary straight line C2, which is an imaginary straight line along the width direction WD. The straight line regions G4A and G4B are inclined line-symmetrically with respect to the imaginary straight line C2. More specifically, the straight line regions G4A and G4B are formed in a state of being not parallel to each other and being inclined at a predetermined angle (for example, 5 degrees) in opposite directions on the longitudinal direction LD side of the magnetic tape MT with the imaginary straight line C2 as a symmetry axis.

The gap patterns G1 and G2 deviate from each other at the predetermined interval described above in a direction LD1 (for example, the same direction as the longitudinal direction LD) corresponding to the longitudinal direction LD between the gap patterns G adjacent to each other along the direction WD1.

The gap patterns G3 and G4 deviate from each other at the predetermined interval described above in a direction LD1 (for example, the same direction as the longitudinal direction LD) corresponding to the longitudinal direction LD between the gap patterns G adjacent to each other along the direction WD1.

The disposition of the gap patterns G in the head core WH2A (that is, the positional relationship between the gap pattern G1 and the gap pattern G2) and the disposition of the gap patterns G in the head core WH2B (the positional relationship between the gap pattern G3 and the gap pattern G4) are the same. That is, the gap patterns G are disposed in common between the head cores WH2A and WH2B.

The pulse currents used in the gap patterns G1 and G2 (that is, the pulse currents supplied from the first pulse signal generator SW4A to the head core WH2A as shown in FIG. 19) are in-phase currents. In addition, the pulse currents used in the gap patterns G3 and G4 (that is, the pulse currents supplied from the second pulse signal generator SW4B to the head core WH2B as shown in FIG. 19) are in-phase currents. That is, the pulse currents used in units of the head cores WH2 are in-phase currents. In the present embodiment, the term "in-phase currents" refers to the in-phase current in the sense including an error generally allowed in the technical field to which the technology of the present disclosure belongs, which is the error to the extent that it does not contradict the purpose of the technology of the present disclosure, in addition to the completely in-phase current.

In the servo pattern recording step, in a state in which the position of the gap pattern G1 corresponds to the position of the servo band SB4 and the position of the gap pattern G2 corresponds to the position of the servo band SB3, the magnetic tape MT runs on the transport passage SW7 at a constant speed. In addition, in a state in which the position of the gap pattern G3 corresponds to the position of the servo band SB2 and the position of the gap pattern G4 corresponds to the position of the servo band SB1, the magnetic tape MT runs on the transport passage SW7 at a constant speed. In this state, the pulse current for the servo pattern 58A and the pulse current for the servo pattern 58B are alternately supplied to the head core WH2A and the head core WH2B.

In a case where the pulse currents for the servo pattern 58A are supplied in phase to the head core WH2A, the servo patterns 58A are recorded on the servo band SB4 and the servo band SB3 in a state of deviating from each other at the predetermined interval in the longitudinal direction LD. In addition, in a case where the pulse currents for the servo pattern 58B are supplied in phase to the head core WH2A, the servo patterns 58B are recorded on the servo band SB4 and the servo band SB3 in a state of deviating from each other at the predetermined interval in the longitudinal direction LD.

In a case where the pulse currents for the servo pattern 58A are supplied in phase to the head core WH2B, the servo patterns 58A are recorded on the servo band SB2 and the servo band SB1 in a state of deviating from each other at the predetermined interval in the longitudinal direction LD. In addition, in a case where the pulse currents for the servo pattern 58B are supplied in phase to the head core WH2B, the servo patterns 58B are recorded on the servo band SB2 and the servo band SB1 in a state of deviating from each other at the predetermined interval in the longitudinal direction LD.

Next, an action of the magnetic tape system 10 will be described.

The magnetic tape cartridge 12 accommodates the magnetic tape MT shown in FIG. 9 (see FIG. 9 and FIG. 11). The magnetic tape cartridge 12 is loaded into the magnetic tape drive 14. In the magnetic tape drive 14, in a case where the magnetic tape MT is subjected to the magnetic processing by the magnetic element unit 42 (see FIGS. 3 and 15), the magnetic tape MT is extracted from the magnetic tape cartridge 12, and the servo pattern 58 in the servo band SB is read by the servo reading element SR of the magnetic head 28.

Here, a set of a plurality of servo bands SBP1 and a set of a plurality of servo bands SBP2 are formed on the magnetic tape MT in the width direction WD. In addition, in the magnetic tape MT, the plurality of servo patterns 58 corresponding to each other between the servo bands SB deviate from each other at the predetermined interval in the longitudinal direction LD of the magnetic tape MT between the servo bands SB adjacent to each other in the width direction WD. Further, the servo pattern 58 records set identification information PID for identifying the corresponding sets of servo bands SBP1 and SBP2. As a result, the servo band SB can be identified based on the deviation at the predetermined interval formed in the servo patterns 58 between the adjacent servo bands SB and the set identification information PID. That is, the set of the servo bands SBP is uniquely specified by a combination of the set identification information PID and the deviation at the predetermined interval between the servo patterns 58. The servo band SB is identified by specifying the set of servo bands SBP. The fact that the servo band SB can be identified also means that the data band DB existing between the adjacent servo bands SB can be identified. Therefore, with the present configuration, the identification of the data band DB can be facilitated.

In addition, the information for identifying the sets of servo bands SBP1 and SBP2 is recorded by a common pulse current. The servo band SB is identified by specifying the set of servo bands SBP. The fact that the servo band SB can be identified also means that the data band DB existing between the adjacent servo bands SB can be identified. Therefore, with the present configuration, the identification of the data band DB can be facilitated.

Next, an action of the servo writer SW will be described.

In the servo writer SW according to the present embodiment, in a case where the servo pattern 58 is recorded on the magnetic tape MT by the servo pattern recording head WH, the magnetic tape MT is fed to the transport passage SW7, and the magnetic tape MT is caused to run at a constant speed. In this case, the position of the gap pattern G1 corresponds to the position of the servo band SB4, and the position of the gap pattern G2 corresponds to the position of the servo band SB3. Further, the position of the gap pattern G3 corresponds to the position of the servo band SB2, and the position of the gap pattern G4 corresponds to the position of the servo band SB1. In this state, the magnetic tape MT is caused to run. Then, the pulse signal for the servo pattern 58A and the pulse signal for the servo pattern 58B are alternately supplied to the head core WH2A and the head core WH2B of the servo pattern recording head WH.

The plurality of gap patterns G are formed in each of the plurality of head cores WH2 that are magnetically separated. The plurality of servo patterns 58 are recorded on the magnetic tape MT by the plurality of gap patterns G in the longitudinal direction LD of the magnetic tape MT, whereby the plurality of servo bands SB are formed along the width direction WD of the magnetic tape MT. The plurality of gap patterns G deviate from each other at a predetermined interval in a direction corresponding to the longitudinal direction LD of the magnetic tape MT between the gap patterns G adjacent to each other along the width direction WD of the magnetic tape MT. As a result, the gap pattern G can be identified in each of the plurality of separated head cores WH2 based on the deviation at the predetermined interval formed between the adjacent gap patterns G. The fact that the gap pattern G can be identified in each of the head cores WH2 means that the plurality of servo bands SB corresponding to the head core WH2 can also be identified in units of the head cores WH2. This also means that the data band DB existing between the adjacent servo bands SB can be identified in units of the head cores WH2. Therefore, with the present configuration, the identification of the data band DB can be facilitated. In addition, since the pulse signal is supplied for each separated head core WH2, the current value indicating the pulse signal can be reduced. For example, the current value supplied to the head core WH2 can be reduced as compared with a case where the current is supplied by changing the pulse signal for each gap pattern G. As a result, the heat generation of the servo pattern recording head WH is suppressed. Therefore, with the present configuration, the thermal influence (for example, thermal contraction of the magnetic tape MT due to the heat generation of the servo pattern recording head WH) in a case of recording the servo pattern 58 on the magnetic tape MT is reduced.

In addition, with the present configuration, the occurrence of crosstalk is reduced. That is, since the plurality of head cores WH2 are magnetically separated from each other, the magnetic field formed by the pulse current supplied to the head core WH2 is prevented from being superimposed on the adjacent head core WH2. As a result, the occurrence of crosstalk is reduced.

In addition, in the servo pattern recording head WH according to the present embodiment, the information indicated by the pulse current includes identification information ID. The servo band SB is formed by recording the plurality of servo patterns 58 in the longitudinal direction LD of the magnetic tape MT by the servo pattern recording head WH in response to the pulse current. As a result, the servo band SB can be identified in units of the head cores WH2. Therefore, the data band DB existing between the servo bands SB adjacent to each other in the width direction of the magnetic tape MT can be identified.

In addition, in the servo pattern recording head WH according to the present embodiment, the identification information ID is common in units of the head cores WH2. Therefore, with the present configuration, the servo patterns 58 recorded by the servo pattern recording head WH having the plurality of head cores WH2 can be identified in units of the head cores WH2.

In addition, in the servo pattern recording head WH according to the present embodiment, the plurality of gap patterns G are disposed in common between the head cores WH2. Therefore, with the present configuration, it is possible to simplify the configuration of the servo pattern recording head WH having the plurality of head cores WH2.

In addition, in the servo pattern recording head WH according to the present embodiment, the pulse currents used in units of the head cores WH2 are in phase. Therefore, with the present configuration, it is possible to simplify the generation of the pulse current supplied for each magnetically separated head core WH2.

In addition, in the servo writer SW according to the present embodiment, the pulse signal generators SW4A and SW4B are provided for the head cores WH2A and WH2B, respectively. As a result, since the pulse current is supplied for each separated head core WH2, the pulse current value can be reduced. For example, the current value supplied to the head core WH2 can be reduced as compared with a case where the current is supplied by providing the pulse signal generator SW4 for each gap pattern G. As a result, the heat generation of the servo pattern recording head WH is suppressed. Therefore, with the present configuration, it is possible to reduce the thermal influence (for example, the thermal contraction of the magnetic tape MT due to the heat generation of the servo pattern recording head WH) in a case of recording the servo pattern 58 on the magnetic tape MT. In addition, for example, the number of the pulse signal generators SW4 can be reduced as compared to a case where the pulse signal generator SW4 is provided for each servo pattern 58, thereby reducing the capital investment in the servo writer SW.

First Modification Example

In the above-described embodiment, the form example has been described in which two gap patterns G are formed on the front surface WH1A of the head core WH2 in the servo pattern recording head WH, but the technology of the present disclosure is not limited to this. In the present first modification example, three gap patterns G are formed on the front surface WH1A of the head core WH2.

As shown in FIG. 21 as an example, the servo pattern recording head WH includes a substrate WH1 and a plurality of head cores WH2. The plurality of head cores WH2 are incorporated in the substrate WH1 along the direction of the long side WH1Aa. The plurality of head cores WH2 are magnetically separated.

A gap pattern G is formed in the head core WH2. The gap pattern G is formed on the front surface WH1A (that is, the surface of the substrate WH1 that faces the front surface 31 of the magnetic tape MT).

In the example shown in FIG. 21, head cores WH2A and WH2B are shown as an example of the plurality of head cores WH2, and gap patterns G11, G12, G13, G14, G15, and G16 are shown as an example of the plurality of gap patterns G. The gap patterns G11, G12, and G13 are formed in the head core WH2A. The gap patterns G14, G15, and G16 are formed in the head core WH2B. In the present modification example, the gap patterns G11 to G16 are examples of a "plurality of gap patterns" according to the technology of the present disclosure.

The gap patterns G11 to G16 has the same geometrical characteristics as each other. In the present modification example, for example, the gap pattern G11 is used for recording the servo pattern 58 (see FIG. 22) on the servo band SB6 (see FIG. 22). The gap pattern G12 is used for recording the servo pattern 58 (see FIG. 22) on the servo band SB5 (see FIG. 22). The gap pattern G13 is used for recording the servo pattern 58 (see FIG. 22) on the servo band SB4 (see FIG. 22). The gap pattern G14 is used for recording the servo pattern 58 (see FIG. 22) on the servo band SB3 (see FIG. 22). The gap pattern G15 is used for recording the servo pattern 58 (see FIG. 22) on the servo band SB2 (see FIG. 22). The gap pattern G16 is used for recording the servo pattern 58 (see FIG. 22) on the servo band SB1 (see FIG. 22).

The gap pattern G11 is a straight line region pair consisting of straight line regions G11A and G11B. In addition, the gap pattern G12 is a straight line region pair consisting of straight line regions G12A and G12B. In addition, the gap pattern G13 is a straight line region pair consisting of straight line regions G13A and G13B. In addition, the gap pattern G14 is a straight line region pair consisting of straight line regions G14A and G14B. In addition, the gap pattern G15 is a straight line region pair consisting of straight line regions G15A and G15B. In addition, the gap pattern G16 is a straight line region pair consisting of straight line regions G16A and G16B.

The pulse signal generator SW4 includes a first pulse signal generator SW4A and a second pulse signal generator SW4B. The first pulse signal generator SW4A is connected to the head core WH2A. The second pulse signal generator SW4B is connected to the head core WH2B.

In a case where the gap pattern G11 is used for the servo band SB6 (see FIG. 22), in a case where the first pulse signal generator SW4A supplies the pulse current to the head core WH2A, the magnetic field is applied to the magnetic tape MT from the gap pattern G11 in response to the pulse current, and the servo pattern 58 (see FIG. 22) is recorded on the magnetic tape MT.

Similarly, for the gap patterns G12 and G13, the servo patterns 58 are recorded in the servo bands SB5 and SB4 by receiving the supply of the pulse current from the first pulse signal generator SW4A.

In a case where the gap pattern G14 is used for the servo band SB3 (see FIG. 22), in a case where the second pulse signal generator SW4B supplies the pulse current to the head core WH2B, the magnetic field is applied to the magnetic tape MT from the gap pattern G14 in response to the pulse current, and the servo patterns 58 (see FIG. 22) are recorded on the magnetic tape MT.

Similarly, for the gap patterns G15 and G16, the servo patterns 58 are recorded on the magnetic tape MT by receiving the supply of the pulse current from the second pulse signal generator SW4B.

The gap patterns G11 and G12 deviate from each other at the predetermined interval described above in a direction LD1 (for example, the same direction as the longitudinal direction LD) corresponding to the longitudinal direction LD between the gap patterns G adjacent to each other along the direction WD1.

In addition, the gap patterns G12 and G13 deviate from each other at the predetermined interval described above in a direction LD1 (for example, the same direction as the longitudinal direction LD) corresponding to the longitudinal direction LD between the gap patterns G adjacent to each other along the direction WD1.

Here, the deviation of the gap pattern G13 from the gap pattern G12 at the predetermined interval is in an opposite direction to the deviation of the gap pattern G12 from the gap pattern G11 at the predetermined interval. In the example shown in FIG. 21, the gap pattern G12 deviates to the right from the gap pattern G11 as viewed from the paper surface side. On the other hand, the gap pattern G13 deviates to the left from the gap pattern G12 as viewed from the paper surface side.

Further, the gap patterns G11 and G13 are disposed at the same position in the direction LD1 corresponding to the longitudinal direction LD. In addition, the gap patterns G13 and G14 are disposed at the same position in the direction LD1 corresponding to the longitudinal direction LD.

The gap patterns G14 and G15 deviate from each other at the predetermined interval described above in a direction LD1 (for example, the same direction as the longitudinal direction LD) corresponding to the longitudinal direction LD between the gap patterns G adjacent to each other along the direction WD1.

In addition, the gap patterns G15 and G16 deviate from each other at the predetermined interval described above in a direction LD1 (for example, the same direction as the longitudinal direction LD) corresponding to the longitudinal direction LD between the gap patterns G adjacent to each other along the direction WD1.

Here, the deviation of the gap pattern G16 from the gap pattern G15 at the predetermined interval is in an opposite direction to the deviation of the gap pattern G15 from the gap pattern G14 at the predetermined interval. In the example shown in FIG. 21, the gap pattern G15 deviates to the right from the gap pattern G14 as viewed from the paper surface side. On the other hand, the gap pattern G16 deviates to the left from the gap pattern G15 as viewed from the paper surface side.

Further, the gap patterns G14 and G16 are disposed at the same position in the direction LD1 corresponding to the longitudinal direction LD.

The disposition of the gap patterns G in the head core WH2A and the disposition of the gap patterns G in the head core WH2B are the same. That is, the gap patterns G are disposed in common between the head cores WH2A and WH2B.

The pulse currents used in the gap patterns G11 to G13 (that is, the pulse currents supplied from the first pulse signal generator SW4A to the head core WH2A as shown in FIG. 21) are in-phase currents. In addition, the pulse currents used in the gap patterns G14 to G16 (that is, the pulse currents supplied from the second pulse signal generator SW4B to the head core WH2B as shown in FIG. 21) are in-phase currents. That is, the pulse currents used in units of the head cores WH2 are in-phase currents.

As shown in FIG. 22 as an example, on the front surface 31 of the magnetic tape MT, servo bands SB1, SB2, SB3, SB4, SB5, and SB6 and data bands DB1, DB2, DB3, DB4, and DB5 are formed. The servo bands SB1 to SB6 are examples of a "servo band" according to the technology of the present disclosure. In the following, for convenience of description, in a case where the distinction is not specifically needed, the servo bands SB1 to SB6 are referred to as a servo band SB, and the data bands DB1 to DB5 are referred to as a data band DB.

The data band DB1 is disposed between the servo band SB1 and the servo band SB2, and the data band DB2 is disposed between the servo band SB2 and the servo band SB3. The data band DB3 is disposed between the servo band SB3 and the servo band SB4. The data band DB4 is disposed between the servo band SB4 and the servo band SB5. The data band DB5 is disposed between the servo band SB5 and the servo band SB6. That is, the servo bands SB and the data bands DB are arranged alternately along the width direction WD.

Here, the servo band SB4, the servo band SB5, and the servo band SB6 form one set of servo bands SBP1. In other words, the set of servo bands SBP1 includes the servo band SB4, the servo band SB5, and the servo band SB6.

In addition, the servo band SB1, the servo band SB2, and the servo band SB3 form another set of servo bands SBP2. In other words, the set of servo bands SBP2 includes the servo band SB1, the servo band SB2, and the servo band SB3.

As described above, in the magnetic tape MT according to the present first modification example, the plurality of servo patterns 58 corresponding to each other between the servo bands SB deviate from each other at the predetermined interval in the longitudinal direction LD of the magnetic tape MT between the servo bands SB adjacent to each other in the width direction WD. Further, the servo pattern 58 records set identification information PID for identifying the corresponding sets of servo bands SBP1 and SBP2. In addition, the set of servo bands SBP includes three servo bands SB.

As a result, even in a case where the set of servo bands SBP includes three servo bands SB, the servo band SB can be identified based on the deviation at the predetermined interval formed in the servo patterns 58 between the adjacent servo bands SB and the information for identifying the sets of servo bands SBP1 and SBP2. That is, the servo band SB is identified by a combination of the set identification information PID, and the deviation at the predetermined interval between the servo patterns 58. The fact that the servo band SB can be identified also means that the data band DB existing between the adjacent servo bands SB can be identified. Therefore, with the present configuration, it is possible to contribute to the identification of the data band DB even in a case where the set of servo bands SBP includes three servo bands SB.

In addition, the set identification information PID is recorded by a common pulse current. As a result, a circuit for supplying the pulse current can be shared, thereby reducing the pulse current value. For example, the current value in a case of recording the servo patterns 58 can be reduced as compared to a case where a circuit is provided for each servo pattern 58 and the current is supplied, thereby recording the servo pattern 58. Therefore, with the present configuration, it is possible to reduce the thermal influence (for example, the thermal contraction of the magnetic tape MT due to the heat generation of the servo pattern recording head WH) in a case of recording the servo pattern 58 on the magnetic tape MT, and the occurrence of crosstalk.

For example, in a case where the servo band SB is identified, a case where only the set identification information PID is used is considered. In this case, the number of the servo bands SB included in the set of servo bands SBP is limited to two. This is because, in a case where the set of servo bands SBP includes three servo bands SB, the servo band SB cannot be identified within the set of servo bands SBP by the set identification information PID alone. Therefore, in a case where the servo band SB is identified using only the set identification information PID, the set of servo bands SBP can include only two servo bands SB. On the other hand, in the magnetic tape MT according to the present first modification example, the servo band SB is identified by using the set identification information PID and the deviation at the predetermined interval between the servo patterns 58. Therefore, even though the set of servo bands SBP includes three servo bands SB, the servo band SB can be identified. That is, in the set of servo bands SBP, even though the common set identification information PID is recorded in the servo patterns 58, the servo band SB in the set of servo bands SBP is identified by the deviation at the predetermined interval between the servo patterns 58.

Second Modification Example

In the above-described first modification example, the form example has been described in which three gap patterns G are formed on the front surface WH1A of the head core WH2 in the servo pattern recording head WH, but the technology of the present disclosure is not limited to this. In the present second modification example, five gap patterns G are formed on the front surface WH1A of the head core WH2.

As shown in FIG. 23 as an example, gap patterns G are formed in the head core WH2. In the example shown in FIG. 23, head cores WH2A and WH2B are shown as an example of the plurality of head cores WH2, and gap patterns G21, G22, G23, G24, G25, and G26 are shown as an example of the plurality of gap patterns G. The gap patterns G21 to G25 are formed in the head core WH2A. The gap pattern G26 is formed in the head core WH2B. Although not shown, four gap patterns G with the same geometrical characteristics and disposition as the gap patterns G22 to G25 are formed in the head core WH2B. In the present modification example, the gap patterns G21 to G26 are examples of a "plurality of gap patterns" according to the technology of the present disclosure.

The pulse signal generator SW4 includes a first pulse signal generator SW4A and a second pulse signal generator SW4B. The first pulse signal generator SW4A is connected to the head core WH2A. The second pulse signal generator SW4B is connected to the head core WH2B.

In a case where the gap pattern G21 is used for the servo band SB6 (see FIG. 24), in a case where the first pulse signal generator SW4A supplies the pulse current to the head core WH2A, the magnetic field is applied to the magnetic tape MT from the gap pattern G21 in response to the pulse current, and the servo pattern 58 (see FIG. 24) is recorded on the magnetic tape MT.

Similarly, for the gap patterns G22 to G25, the servo patterns 58 are recorded on the magnetic tape MT by receiving the supply of the pulse current from the first pulse signal generator SW4A.

The gap patterns G21 and G22 deviate from each other at the predetermined interval described above in a direction LD1 (for example, the same direction as the longitudinal direction LD) corresponding to the longitudinal direction LD between the gap patterns G adjacent to each other along the direction WD1.

In addition, the gap patterns G22 and G23 deviate from each other at the predetermined interval described above in a direction LD1 (for example, the same direction as the longitudinal direction LD) corresponding to the longitudinal direction LD between the gap patterns G adjacent to each other along the direction WD1.

Here, the deviation of the gap pattern G23 from the gap pattern G22 at the predetermined interval is in an opposite direction to the deviation of the gap pattern G22 from the gap pattern G21 at the predetermined interval. In the example shown in FIG. 23, the gap pattern G22 deviates to the right from the gap pattern G21 as viewed from the paper surface side. On the other hand, the gap pattern G23 deviates to the left from the gap pattern G22 as viewed from the paper surface side.

Further, the gap patterns G21 and G23 are disposed at the same position in the direction LD1 corresponding to the longitudinal direction LD.

The gap patterns G23 and G24 deviate from each other at an interval different from the predetermined interval described above (for example, an interval twice the predetermined interval) in a direction LD1 (for example, the same direction as the longitudinal direction LD) corresponding to the longitudinal direction LD between the gap patterns G adjacent to each other along the direction WD1.

The gap patterns G24 and G25 deviate from each other at an interval different from the predetermined interval described above (for example, an interval twice the predetermined interval) in a direction LD1 (for example, the same direction as the longitudinal direction LD) corresponding to the longitudinal direction LD between the gap patterns G adjacent to each other along the direction WD1.

Here, the deviation of the gap pattern G25 from the gap pattern G24 at the predetermined interval is in an opposite direction to the deviation of the gap pattern G24 from the gap pattern G23 at the predetermined interval. In the example shown in FIG. 23, the gap pattern G24 deviates to the right from the gap pattern G23 as viewed from the paper surface side. On the other hand, the gap pattern G25 deviates to the left from the gap pattern G24 as viewed from the paper surface side.

Further, the gap patterns G25 and G26 are disposed at the same position in the direction LD1 corresponding to the longitudinal direction LD.

The disposition of the gap patterns G in the head core WH2A and the disposition of the gap patterns G in the head core WH2B are the same. That is, the gap patterns G are disposed in common between the head cores WH2A and WH2B.

The pulse currents used in the gap patterns G21 to G25 (that is, the pulse currents supplied from the first pulse signal generator SW4A to the head core WH2A as shown in FIG. 23) are in-phase currents. In addition, the pulse currents used in the gap pattern G26 (that is, the pulse currents supplied from the second pulse signal generator SW4B to the head core WH2B as shown in FIG. 23) are in-phase currents. That is, the pulse currents used in units of the head cores WH2 are in-phase currents.

As shown in FIG. 24 as an example, on the front surface 31 of the magnetic tape MT, servo bands SB1, SB2, SB3, SB4, SB5, and SB6 and data bands DB1, DB2, DB3, DB4, and DB5 are formed. The servo bands SB1 to SB6 are examples of a "servo band" according to the technology of the present disclosure. In the following, for convenience of description, in a case where the distinction is not specifically needed, the servo bands SB1 to SB6 are referred to as a servo band SB, and the data bands DB1 to DB5 are referred to as a data band DB.

The data band DB1 is disposed between the servo band SB1 and the servo band SB2, and the data band DB2 is disposed between the servo band SB2 and the servo band SB3. The data band DB3 is disposed between the servo band SB3 and the servo band SB4. The data band DB4 is disposed between the servo band SB4 and the servo band SB5. The data band DB5 is disposed between the servo band SB5 and the servo band SB6. That is, the servo bands SB and the data bands DB are arranged alternately along the width direction WD.

Here, the servo band SB6, the servo band SB5, the servo band SB4, the servo band SB3, and the servo band SB2 form one set of servo bands SBP1. In other words, the set of servo bands SBP1 includes the servo band SB6, the servo band SB5, the servo band SB4, the servo band SB3, and the servo band SB2.

As described above, in the magnetic tape MT according to the present second modification example, the plurality of servo patterns 58 corresponding to each other between the servo bands SB deviate from each other at the predetermined interval in the longitudinal direction LD of the magnetic tape MT between the servo bands SB adjacent to each other in the width direction WD. Further, the servo pattern 58 records set identification information for identifying the corresponding sets of servo bands SBP1 and SBP2. In addition, the set of servo bands SBP includes five servo bands SB.

As a result, even in a case where the set of servo bands SBP includes three servo bands SB, the servo band SB can be identified based on the deviation at the predetermined interval formed in the servo patterns 58 between the adjacent servo bands SB and the information for identifying the sets of servo bands SBP1 and SBP2. That is, the servo band SB is identified by a combination of the set identification information PID, and the deviation at the predetermined interval between the servo patterns 58. The fact that the servo band SB can be identified also means that the data band DB existing between the adjacent servo bands SB can be identified. Therefore, with the present configuration, it is possible to contribute to the identification of the data band DB even in a case where the set of servo bands SBP includes five servo bands SB.

In addition, the set identification information PID is recorded by a common pulse current. As a result, a circuit for supplying the pulse current can be shared, thereby reducing the pulse current value. For example, the current value in a case of recording the servo patterns 58 can be reduced as compared to a case where a circuit is provided for each servo pattern 58 and the current is supplied, thereby recording the servo pattern 58. Therefore, with the present configuration, it is possible to reduce the thermal influence (for example, the thermal contraction of the magnetic tape MT due to the heat generation of the servo pattern recording head WH) in a case of recording the servo pattern 58 on the magnetic tape MT.

In the above-described embodiment, the form example in which the predetermined interval is a value determined in advance has been described, but the technology of the present disclosure is not limited to this. For example, the predetermined interval is defined based on the angle α formed by the interval between the frames 56 having a correspondence relationship between the servo bands SB adjacent to each other in the width direction WD and the imaginary straight line C1, and the pitch between the servo bands SB adjacent to each other in the width direction WD (that is, the servo band pitch). In this case, for example, the predetermined interval is calculated from Expression (2).

$$(\text{Predetermined interval}) = (\text{Servo band pitch}) \times \tan\alpha \qquad (2)$$

As described above, Expression (2) does not include the frame length. This means that the predetermined interval is calculated even in a case where the frame length is not considered. Therefore, with the present configuration, the predetermined interval can be calculated more easily than in a case of calculating the predetermined interval from Expression (1).

In the above-described embodiment, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 are integrated in advance), the technology of the present disclosure is established.

In the above-described embodiment, the single magnetic head 28 has been described, but the technology of the present disclosure is not limited to this. For example, a plurality of magnetic heads 28 may be disposed on the magnetic tape MT. For example, the magnetic head 28 for reading and at least one magnetic head 28 for writing may be disposed on the magnetic tape MT. The magnetic head 28 for reading may be used for verifying the data recorded on the data band DB by the magnetic head 28 for writing. In addition, one magnetic head on which the magnetic element unit 42 for reading and at least one magnetic element unit 42 for writing are mounted may be disposed on the magnetic tape MT.

In the above-described embodiment, the form example has been described in which the servo pattern recording head WH comprises two head cores WH2A and WH2B, but the technology of the present disclosure is not limited to this. The servo pattern recording head WH may comprise three or more head cores WH2.

The content of the above description and the content of the drawings are detailed explanations of the parts relating to the technology of the present disclosure, and are merely examples of the technology of the present disclosure. For example, description related to the above configurations, functions, actions, and effects is description related to an example of configurations, functions, actions, and effects of the parts relating to the technology of the present disclosure. Thus, it is needless to say that unnecessary portions may be deleted, new elements may be added, or replacement may be made to the content of the above description and the content of the drawings without departing from the gist of the technology of the present disclosure. In order to avoid complication and easily understand the parts relating to the technology of the present disclosure, in the content of the above description and the content of the drawings, the description regarding common general technical knowledge which is not necessarily particularly described in terms of embodying the technology of the present disclosure is omitted.

In the present specification, "A and/or B" is synonymous with "at least one of A or B". That is, "A and/or B" may refer to A alone, B alone, or a combination of A and B. In addition, in the present specification, in a case where three or more matters are expressed with the connection of "and/or", the same concept as "A and/or B" is applied.

All documents, patent applications, and technical standards mentioned in the present specification are incorporated herein by reference to the same extent as in a case in which each document, each patent application, and each technical standard are specifically and individually described by being incorporated by reference.

The disclosure of JP2022-110796 filed on Jul. 8, 2023 is incorporated herein by reference in its entirety.

The following appendices are further disclosed with respect to the above embodiment.

APPENDIX 1

A servo pattern recording head comprising:
a plurality of head cores that are magnetically separated from each other; and
a plurality of gap patterns that are formed on a front surface of each of the plurality of head cores and that are used for recording a plurality of servo patterns in a width direction of a magnetic tape by applying a magnetic field to the magnetic tape in response to a pulse current,
in which the plurality of gap patterns are formed on the front surface along a direction corresponding to the width direction, and
the plurality of gap patterns deviate from each other at a predetermined interval in a direction corresponding to a longitudinal direction of the magnetic tape between the gap patterns adjacent to each other along the direction corresponding to the width direction.

APPENDIX 2

The servo pattern recording head according to Appendix 1,
in which information indicated by the pulse current includes identification information for identifying the plurality of servo patterns in units of the head cores.

APPENDIX 3

The servo pattern recording head according to Appendix 2,
in which the identification information is common in the units of the head cores.

APPENDIX 4

The servo pattern recording head according to any one of Appendices 1 to 3,
in which the plurality of gap patterns are disposed in common between the head cores.

APPENDIX 5

The servo pattern recording head according to any one of Appendices 1 to 4,
in which the pulse currents used in units of the head cores are in phase with each other.

APPENDIX 6

A servo pattern recording device comprising:
the servo pattern recording head according to any one of Appendices 1 to 5; and
a pulse signal generator that supplies the pulse current to the plurality of head cores,
in which the pulse signal generator is provided for each of the plurality of head cores.

APPENDIX 7

A magnetic tape on which the servo pattern is recorded using the servo pattern recording head according to any one of Appendices 1 to 5.

What is claimed is:
1. A servo pattern recording head comprising:
a plurality of head cores that are magnetically separated from each other; and
a plurality of gap patterns that are formed on a front surface of each of the plurality of head cores and that are used for recording a plurality of servo patterns in a width direction of a magnetic tape by applying a magnetic field to the magnetic tape in response to a pulse current,
wherein the plurality of gap patterns are formed on the front surface along a direction corresponding to the width direction, and
the plurality of gap patterns deviate from each other at a predetermined interval in a direction corresponding to a longitudinal direction of the magnetic tape between the gap patterns adjacent to each other along the direction corresponding to the width direction.
2. The servo pattern recording head according to claim 1, wherein information indicated by the pulse current includes identification information for identifying the plurality of servo patterns in units of the head cores.
3. The servo pattern recording head according to claim 2, wherein the identification information is common in the units of the head cores.
4. The servo pattern recording head according to claim 1, wherein the plurality of gap patterns are disposed in common between the head cores.
5. The servo pattern recording head according to claim 1, wherein the pulse currents used in units of the head cores are in phase with each other.

6. A servo pattern recording device comprising:

the servo pattern recording head according to claim 1; and a pulse signal generator that supplies the pulse current to the plurality of head cores, wherein the pulse signal generator is provided for each of the plurality of head cores.

7. A magnetic tape on which the servo pattern is recorded using the servo pattern recording head according to claim 1.

8. A magnetic tape cartridge comprising:

the magnetic tape according to claim 7; and a case in which the magnetic tape is accommodated.

9. A magnetic tape drive comprising:

a running mechanism that causes the magnetic tape according to claim 7 to run along a predetermined path; and a magnetic head that reads the servo pattern on the predetermined path in a state in which the magnetic tape is running by means of the running mechanism.

10. A magnetic tape system comprising:

the magnetic tape according to claim 7; and a magnetic tape drive in which a magnetic head that reads the servo pattern on a predetermined path in a state in which the magnetic tape is running along the predetermined path is mounted.

11. A manufacturing method of a magnetic tape, comprising:

supplying a pulse current to a plurality of head cores that are magnetically separated from each other; and recording a plurality of servo patterns in a width direction of the magnetic tape by applying a magnetic field to the magnetic tape in response to the pulse current via a plurality of gap patterns that are formed on a front surface of each of the plurality of head cores, wherein the plurality of gap patterns are formed on the front surface along a direction corresponding to the width direction, and the plurality of gap patterns deviate from each other at a predetermined interval in a direction corresponding to a longitudinal direction of the magnetic tape between the gap patterns adjacent to each other along the direction corresponding to the width direction.

12. The manufacturing method of a magnetic tape according to claim 11, wherein information indicated by the pulse current includes identification information for identifying the plurality of servo patterns in units of the head cores.

* * * * *